United States Patent
Kobayashi et al.

[11] Patent Number: 5,566,158
[45] Date of Patent: Oct. 15, 1996

[54] INFORMATION RECORDING MEDIUM AND A RECORDING APPARATUS AND A REPRODUCING APPARATUS THEREFOR

[75] Inventors: Seiji Kobayashi, Tokyo; Hiroshige Okamura, Kanagawa; Hisayuki Yamatsu, Tokyo, all of Japan

[73] Assignee: Sony Corporation, Tokyo, Japan

[21] Appl. No.: 455,336

[22] Filed: May 31, 1995

Related U.S. Application Data

[62] Division of Ser. No. 133,124, Dec. 6, 1993.

[30] Foreign Application Priority Data

| Feb. 14, 1992 | [JP] | Japan | 4-59710 |
| Jul. 10, 1992 | [JP] | Japan | 4-207074 |
| Feb. 15, 1993 | [WO] | WIPO | PCT/JP93/00186 |

[51] Int. Cl.⁶ ............................................ G11B 7/00
[52] U.S. Cl. .................. 369/48; 369/54; 369/58; 369/59; 369/275.4
[58] Field of Search ................... 369/48, 54, 58, 369/116, 32, 275.3–275.4, 44.26, 59, 124, 109, 110, 111

[56] References Cited

U.S. PATENT DOCUMENTS

| 4,809,251 | 2/1989 | Collomby et al. | 369/32 |
| 4,873,680 | 10/1989 | Chung et al. | 369/59 |
| 4,932,017 | 6/1990 | Van Uijen | 369/48 |
| 5,206,853 | 4/1993 | Tanaka | 369/54 |
| 5,233,589 | 8/1993 | Saito et al. | 369/59 X |
| 5,282,185 | 1/1994 | Mori et al. | 369/48 |
| 5,321,680 | 6/1994 | Bailey | 369/59 |
| 5,347,505 | 9/1994 | Moritsugu et al. | 369/59 |
| 5,414,689 | 5/1995 | Maeda et al. | 369/116 |
| 5,418,770 | 5/1995 | Ide et al. | 369/116 |

FOREIGN PATENT DOCUMENTS

| 0540345A1 | 5/1993 | European Pat. Off. |
| 3-288331 | 12/1991 | Japan . |
| 4-74317 | 3/1992 | Japan . |
| 4-366426 | 12/1992 | Japan . |

*Primary Examiner*—W. R. Young
*Attorney, Agent, or Firm*—Limbach & Limbach L.L.P.

[57] ABSTRACT

In an information recording medium from which information recorded on each pit is reproduced by an optical detection system that obtains a reproduced signal corresponding to each pit by scanning the information recording medium along pit rows by a light beam, data of high recording density can be accurately reproduced by a simple arrangement by shifting in a step-wise fashion edge positions of an information pit from a predetermined reference position in response to digital information to be recorded within a range corresponding to a predetermined shift period smaller than a transition period of a reproduced signal determined in response to a transfer characteristic of the optical detection system. Therefore, a nonlinear intersymbol interference can be reduced without emphasizing a noise component.

26 Claims, 33 Drawing Sheets

0.32 μm/bit 0.36 μm/bit 0.46 μm/bit

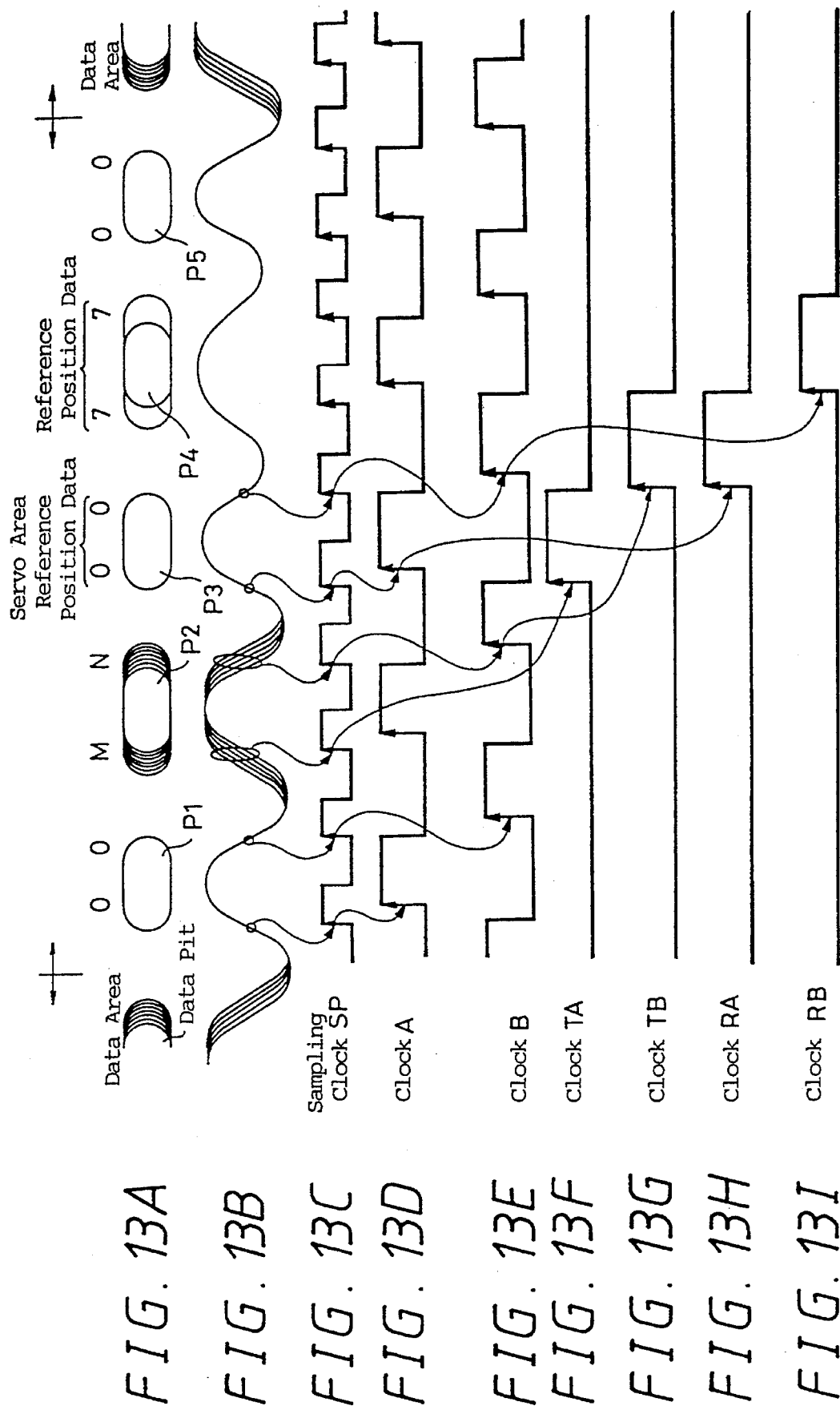

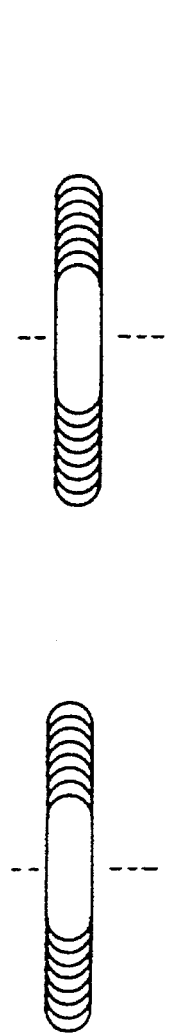
FIG. 18A  Pit Rows
FIG. 18B  RF Signal
FIG. 18C  Sampling Clock SP
FIG. 18D  Clock A
FIG. 18E  Clock B
FIG. 18F  Clock A
FIG. 18G  Clock B

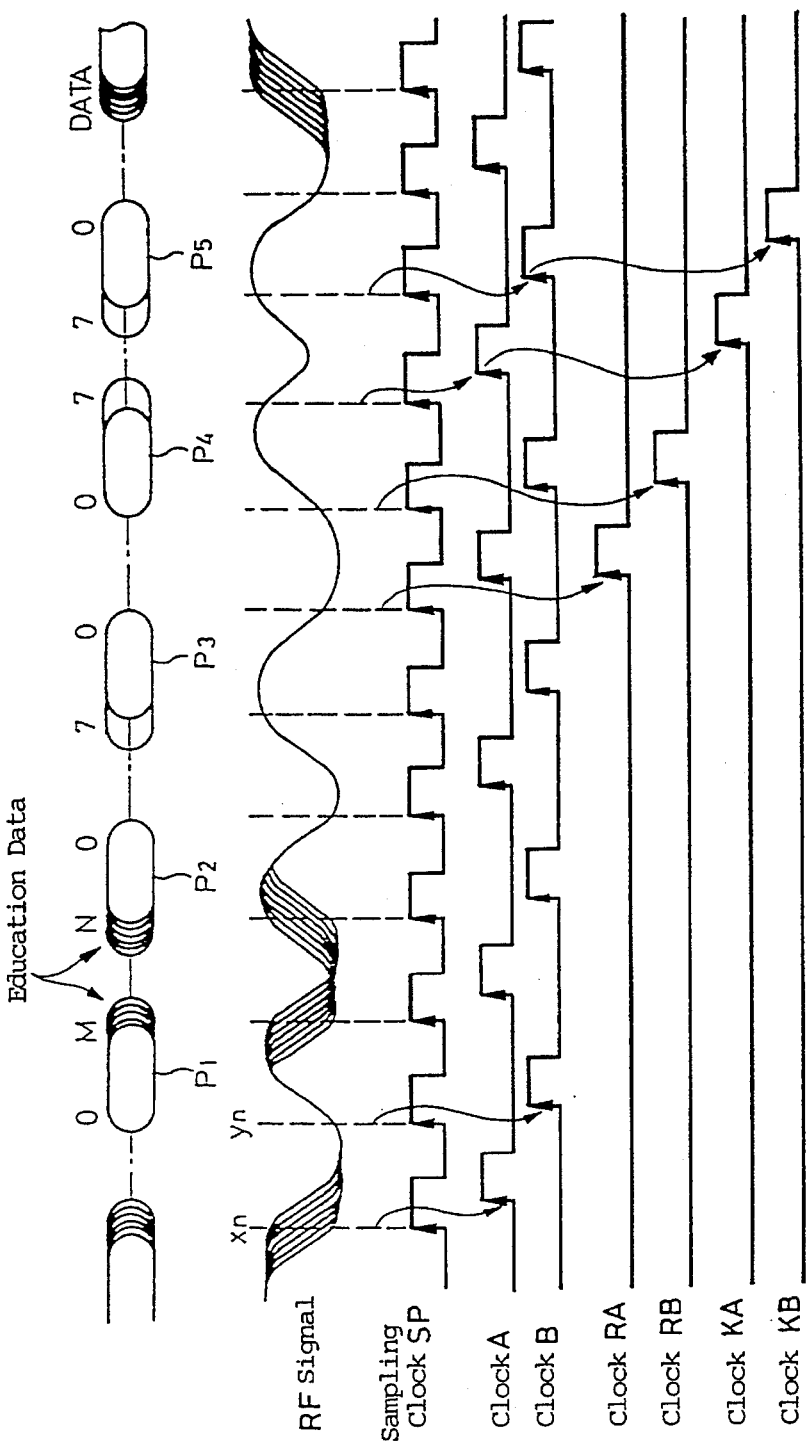

Envelope of Reproduced Signal

Envelope of Reproduced Signal

FIG. 29

| | Rn-1 & Rn | Rn-1 & Rn+1 | Rn-1 & Rn+2 | Rn & Rn+1 | Rn & Rn+2 | Rn+1 & Rn+2 |
|---|---|---|---|---|---|---|
| Rn-1 is Maximum Value | 1 | 1 | 1 | x | x | x |
| Rn is Maximum Value | 0 | x | x | 1 | 1 | x |
| Rn+1 is Maximum Value | x | 0 | x | 0 | x | 1 |
| Rn+2 is Maximum Value | x | x | 0 | x | 0 | 0 |
| Rn-1 is Minimum Value | 0 | 0 | 0 | x | x | x |
| Rn is Minimum Value | 1 | x | x | 0 | 0 | x |
| Rn+1 is Minimum Value | x | 1 | x | 1 | x | 0 |
| Rn+2 is Minimum Value | x | x | 1 | x | 1 | 1 |

Table Used to Detect Maximum and Minimum Values from Signal SAB on the Basis of Compared Results of Magnitude

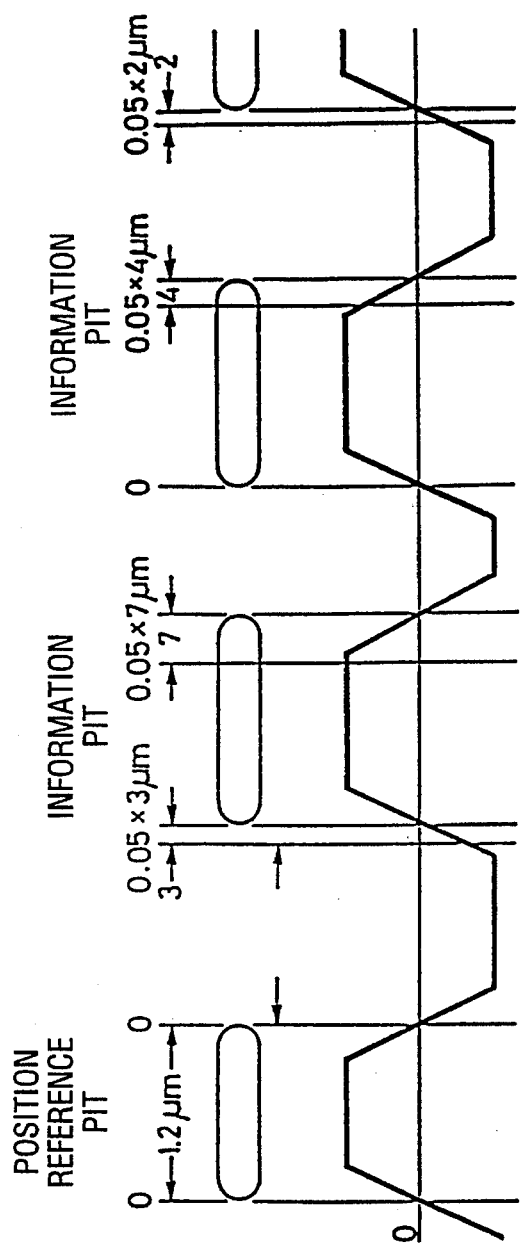
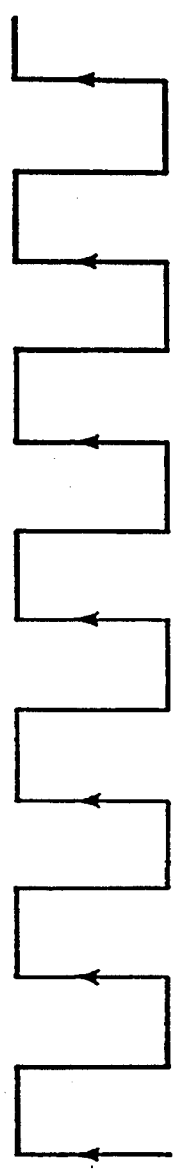
FIG. 33A (PRIOR ART) PIT
FIG. 33B (PRIOR ART) RECORDED SIGNAL
FIG. 33C (PRIOR ART) REFERENCE CLOCK

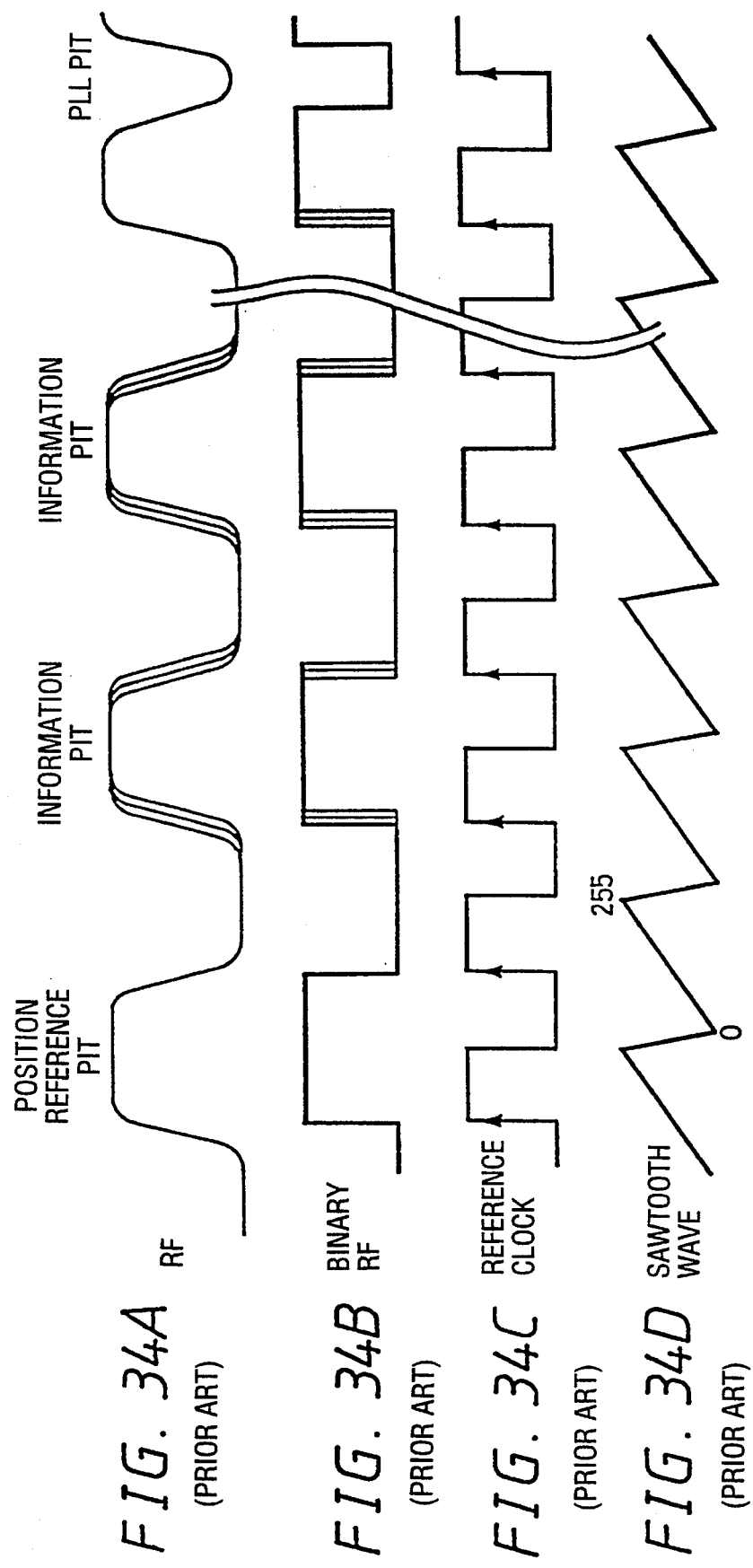

INFORMATION RECORDING MEDIUM AND A RECORDING APPARATUS AND A REPRODUCING APPARATUS THEREFOR

This is a divisional of application Ser. No. 08/133,124, filed Dec. 6, 1993, now pending.

TECHNICAL FIELD

The present invention relates to information recording medium such as an optical disk or the like and an information medium recording apparatus and a reproducing apparatus suitable for recording or reproducing information on or from this information recording medium.

BACKGROUND ART

In a conventional optical disk used in a CAV (constant angular velocity) mode, a servo byte interval is cyclically provided at a predetermined position of each track. A clock pit for generating a reference clock and a wobbled pit for effecting tracking are formed in this servo byte interval. A reference clock (channel clock) is generated in accordance with the clock pit and information is recorded digitally by a pit whose length is an integral multiple of the period of this reference clock. Further, in the system such as a CD (compact disc) that is used in a CLV (constant linear velocity) mode, although there exists no clock pit, a length of the recorded pit and the pit interval are selected so as to become a length (9 kinds of lengths ranging from about 0.9 to 3.3 μm in the case of CD) of an integral multiple of the reference clock (channel clock). Then, a clock is reproduced by using the clock pit and recorded information is sampled at the unit of bits.

In a video disc which is the same optical disk, a video signal is recorded and reproduced by a difference of a pit considerably smaller than that of the CD.

This fact will be described with reference to a signal recorded on a portion of a radius 55 mm in the CAV mode. In the video disk, a brightest portion in a video signal is recorded as a signal of 9.3 MHz and a darkest portion is recorded as a signal of 7.6 MHz, and these signals are equivalent to 1.075 μm and 1.316 μm on a disk having a radius of 55 mm, respectively. It is a well-known fact that, if the disk thus recorded is reproduced, then a very beautiful picture is reproduced. Considering that the change of brightness of 128 gradations can be expressed in this picture, then this means that the period of the pit is recorded on the disk in the gradation of 128 or more and then reproduced therefrom. That is, the change of fine pit length and pit interval of (1.316 μm−1.075 μm)÷128=0.002 μm is reflected on the video signal.

With respect to the change of the pit length, the reason that the minimum unit of the change of the pit length must be increased to be 0.3 μm regardless of the fact that the very small change can be recorded is mainly assumed to be such that a recording and reproducing method is not optimum.

The present applicant has previously proposed, as Japanese patent application No. 3-167585, a method in which digital information is recorded by shifting the position of a front or rear edge of an information pit in a step-wise fashion from a predetermined reference position in response to recording information. According to this recording and reproducing method, since the change of the position of the pit length and pit edge can be detected with a very high accuracy, it becomes possible to record information by a very small change that is considered to be impossible. As a result, the recording with higher density than ever can be realized.

FIG. 33 shows a principle of recording information by shifting in a step-wise fashion the position of the edge as the present applicant has previously proposed. As shown in the figure, a recording signal (FIG. 33B) that is PWM-modulated is generated in response to recording data. Then, a pit (FIG. 33A) corresponding to the length in zero-cross is formed. With this arrangement, the position of the edge of the pit is changed in a step-wise fashion from the position indicated by a reference clock (FIG. 33C). Data of 8 stages (3 bits) from 0 to 7 can be recorded per edge in response to the amount of such change.

FIG. 34 shows a principle of reproducing the signal thus recorded. A binary RF signal (FIG. 34B) is obtained by considerably amplifying an RF signal (FIG. 34A) reproduced from the information recording medium. Because the clock pits are formed on the disc in which information is recorded, a reference clock (FIG. 34C) is generated on the basis of the clock pits, and further a sawtooth wave signal (FIG. 34D) is generated in synchronism with this reference clock. Then, the position of the edge of the information pit is detected by detecting a timing at which the sawtooth wave signal and the binary RF signal cross each other.

However, in the previously-proposed arrangement, there occurs an intersymbol interference between the adjacent edges. Further, if the recording density is increased, there is then the problem that the accurate reproduction becomes impossible.

It is considered to use an equalizer in order to reduce the influence of the intersymbol interference. For example, the reproduced RF signal is spaced apart by a constant distance Δ by using 3-tap equalizer and then sampled three times. Then, three values are processed by a linear calculation. An impulse response in this case is expressed as:

$$h(t)=\delta(t)-\kappa\{\delta(t+\Delta)+\delta(t-\Delta)\}$$

Therefore, its frequency response is expressed as follows:

$$H(f)=1-\kappa\cos(2\pi\Delta f)$$

By properly selecting Δ and κ, the influence of the intersymbol interference can be reduced while the signal component of the high frequency region can be emphasized.

However, since there is performed the linear calculation, this processing cannot be perfectly applied to a nonlinear intersymbol interference. Also, if a value of a coupling coefficient κ is increased in order to increase a degree of eliminating the intersymbol interference, a noise component of the high frequency region is emphasized, which presents a Contrary effect.

Further, in the previously-proposed arrangement, when the position of the edge is detected, the sawtooth wave is generated and the timing at which the edge is produced is detected from the sawtooth wave. Therefore, the arrangement for reading this timing at which the edge is produced becomes complicated. There is then the problem that it becomes impossible to accurately detect such timing.

Furthermore, in the previously-proposed arrangement, influences such as an amplitude fluctuation peculiar to the optical disk and a fluctuation of the bias component are not taken into consideration at all. There is then the drawback that correct data cannot be read out due to these fluctuations.

DISCLOSURE OF INVENTION

In view of the aforesaid situation, according to the present invention, data recorded with high density can be accurately reproduced by a simple arrangement. Also, a nonlinear intersymbol interference can be reduced without emphasizing a noise component.

An information recording medium according to the present invention is characterized in that, as shown in FIGS. 1 and 2, for example, the edge position of an information pit is shifted in a step-wise fashion from a predetermined reference position in response to digital information to be recorded within a range corresponding to a predetermined shift period smaller than a transition period of a reproduced signal determined depending on a transfer characteristic of an optical detection system which obtains a reproduced signal corresponding to each pit by scanning the medium along pit rows by a light beam.

Further, there is added an education pit, inserted into pit rows, whose edge position is shifted in a step-wise fashion from a predetermined reference position in response to education data and which is set in advance in response to the insertion position.

Further, there is added a reference pit which is inserted into the pit rows of information pits and the shift amount of the edge position of which is set to be a minimum value.

Furthermore, there is added a reference pit which is inserted into pit rows of information pits and the shift amount of the edge position of which is set to be a maximum value.

An information recording apparatus according to the present invention includes, as shown in FIG. 32, for example, recording means for recording digital information on an information recording medium from which recorded information is reproduced by an optical detection system that scans the medium along the pit rows by a light beam by shifting in a step-wise fashion the edge position of information pit from a predetermined reference position within a range corresponding to a predetermined shift period smaller than a transition period of a reproduced signal determined depending on a transfer characteristic of the above-mentioned optical detection system.

According to the present invention, there is provided an information reproducing apparatus in which, as shown in FIG. 5, for example, recorded information is reproduced from an information recording medium in which digital information is recorded by shifting in a step-wise fashion the edge position of the information pit from a predetermined reference position within a range corresponding to a predetermined shift period smaller than a transition period of a reproduced signal determined depending on a transfer characteristic of an optical detection system that scans the medium by a light beam along pit rows. This information reproducing apparatus includes clock generating means for generating a clock that is synchronized to the reference position in phase on the basis of the reproduced signal from the optical detection system, a level detecting means for detecting the reproducing level in the transition period of the reproduced signal, and a judging means for judging recorded information corresponding to the shift amount of the edge position of the information pit on the basis of the reproducing level.

Further, the clock generating means generates a clock at a timing corresponding to a center of the shift period.

Further, the clock generating means generates a clock synchronized to the reference position in phase on the basis of the reproduced signal obtained through the optical detection system from the reference pit that indicates a predetermined reference position recorded in a servo area of the information recording medium.

Further, the level detecting means is formed of an A/D converter circuit that detects the reproducing level by analog-to-digital converting the reproducing signal at a sampling timing defined by the above-mentioned clock.

Further, the judging means judges recorded information corresponding to respective shift amounts of the adjacent edge positions of the pit row direction of the information pit on the basis of reference points defined by the reproducing levels sequentially detected by the level detecting means from education pits in which education data pre-determined in response to the insertion position in the pit row of the information pit are set as respective shift amounts of the edge positions adjacent in the pit row direction and information points defined by the reproducing levels sequentially detected from the information pit.

Further, the judging means judges a pair of recorded informations corresponding to respective shift amounts of a pair of edge positions adjacent in the pit row direction of the information pit on the basis of reference points defined by a pair of reproducing levels detected by the level detecting means from education pits in which a pair of education data pre-determined in response to the insertion position are set aa respective shift amounts of the pair of edge positions and information points defined by the pair of reproducing levels detected from the information pit.

Further, of a pair of reproducing levels detected from the education pit in which a pair of education data are set, an address defined when one reproducing level is set to a high-order address and the other reproducing level is set to a low-order address is used as a reference point. There is provided memory means in which a pair of education data are stored in this reference point as decoded data. The above judging means uses an address which is defined when one reproducing level of a pair of reproducing levels detected from the information pit is set to a high-order address and the other reproducing level is set to a low-order address as an information point and judges a pair of decoded data stored in the memory at its address corresponding to this information point as recording information.

Furthermore, the judging means judges, of decoded data stored in the respective reference points of the memory means, decoded data stored in the reference point nearest to the information point as the recording information.

Furthermore, there is provided mapping means using as a reference point an address of the memory means defined by the reproducing level detected from the education pit in which education data is set and which effects a mapping processing for storing the education data in this reference point as decoded data.

Furthermore, the mapping means stores decoded data stored in the reference point nearest to each storage point in respective storage points other than reference point of respective storage points of the memory means.

Further, there is provided a bias eliminating means which subtracts the reproducing level detected from the reference pit in which the shift amount of the edge position is set to a minimum value from the reproducing level detected by the level detecting means.

Further, the bias eliminating means includes a defect eliminating function to subtract from the reproducing level an average value of respective values except a maximum value and a minimum value of a plurality of reproducing levels detected from a plurality of reference pits in which the shift amount of the edge position is set to a minimum value.

Further, there is provided a gain adjusting means for adjusting a gain of a reproducing level detected by the level detecting means such that the reproducing level detected from the reference pit in which the shift amount of the edge position is set to a maximum value becomes a predetermined target value.

Further, the gain adjusting means includes a defect eliminating function to adjust the gain of the reproducing level such that an average value of respective values except a maximum value and a minimum value of a plurality of reproducing levels detected from a plurality of reference pits in which the shift amount of the edge position is set to a maximum value becomes a predetermined target value.

In the information recording medium according to the present invention, the edge position of the information pit is shifted in a step-wise fashion from the predetermined reference position in response to digital information to be recorded within a range corresponding to a predetermined shift period smaller than a transition period of the reproducing signal determined depending on the transfer characteristic of the optical detection system.

Therefore, according to the information reproducing apparatus of the present invention, the recorded information corresponding to the shift amount of the edge position of the information pit can be judged reliably by detecting the reproducing level at one sampling timing in the transition period of the reproduced signal. Thus, it becomes possible to accurately reproduce information of high recording density by a simple arrangement.

Furthermore, by judging the recorded information corresponding to the respective shift amounts of the edge positions adjacent in the pit row direction of the information pit on the basis of reference points defined by the reproducing levels sequentially detected from the education pit in which education data pre-determined in response to the insertion position relative to the pit row of the information pit are set as respective shift amount of the edge positions adjacent in the pit row direction and information points defined by the reproducing levels sequentially detected from the information pit, it becomes possible to reduce a nonlinear intersymbol interference to thereby effect the accurate decoding without emphasizing a noise component.

BRIEF DESCRIPTION OF DRAWINGS

FIGS. 13A–13I are timing charts used to explain operation of a servo area in the embodiment of FIG. 8, FIGS. 23A–23I are timing charts used to explain operation of the embodiment of FIG. 22, FIGS. 24A and 24B are diagrams used to explain the change of level of the outputs of gain variable amplifiers 63, 66 in FIG. 22, FIG. 29 is a diagram of a table used to explain a calculation in a controller 104 of FIG. 26, FIGS. 33A and 33C are diagrams used to explain a data recording method in a conventional optical disk, and FIGS. 34A and 34D are diagrams used to explain a data reproducing method in the conventional optical disk.

BEST MODE FOR CARRYING OUT THE INVENTION

Embodiments of the present invention will hereinafter be described with reference to the drawings.

Figure 1:
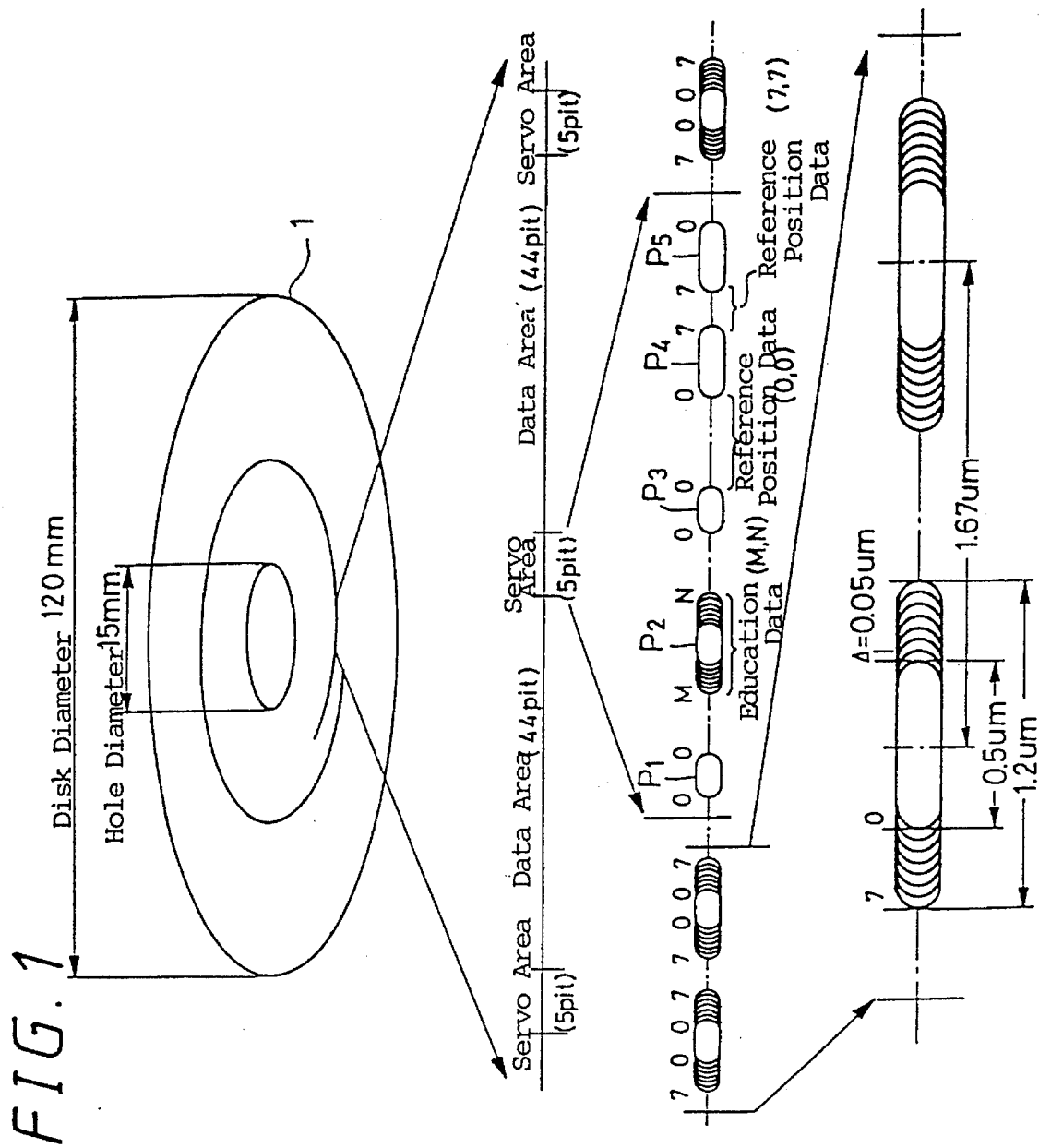
FIG. 1 is a diagram used to explain arrangements of a data area and a servo area of an information recording medium of the present invention.

FIG. 1 shows an example of a fundamental format of an optical disk to which the information recording medium of the present invention is applied.

In this embodiment, on a reflection type (pits are formed on a reflection surface of a light beam in the form of physical concave portions or convex portions) optical disk 1 having a diameter of 120 mm, there are recorded pit rows at the track pitch of 1.6 μm in the CLV mode. All informations are recorded as shift amounts of 8 stages of edge positions of the front (leading edge) and a rear (trailing edge) of the pit disposed at every constant period of 1.67 μm. A unit shift amount Δ that is one unit of this shift amount is set to 0.05 μm.

Because each 3-bit information can be recorded by the shift amount of the 8 stages of the edge positions of each pit arranged as described above, the linear recording information density in the pit row direction is 0.28 μm/bit, which is more than twice that of the present CD system.

Incidentally, in the CD system, even when the linear velocity is set to an upper limit of 1.2 m/s, 8-bit data to be recorded is converted into 17-bit channel bit of 14-bit information bit and 3-bit margin bit by an EFM (Eight to Fourteen Modulation) and then recorded. Taking this EFM into consideration, the linear recording information density is about 0.6 μm/bit. That is to say, since the shortest pit of about 0.9 μm corresponds to the channel bit of 3 bits, we have:

$(0.9 \div 3) \times (17 \div 8) = $ about 0.6 μm/bit

Figure 2:
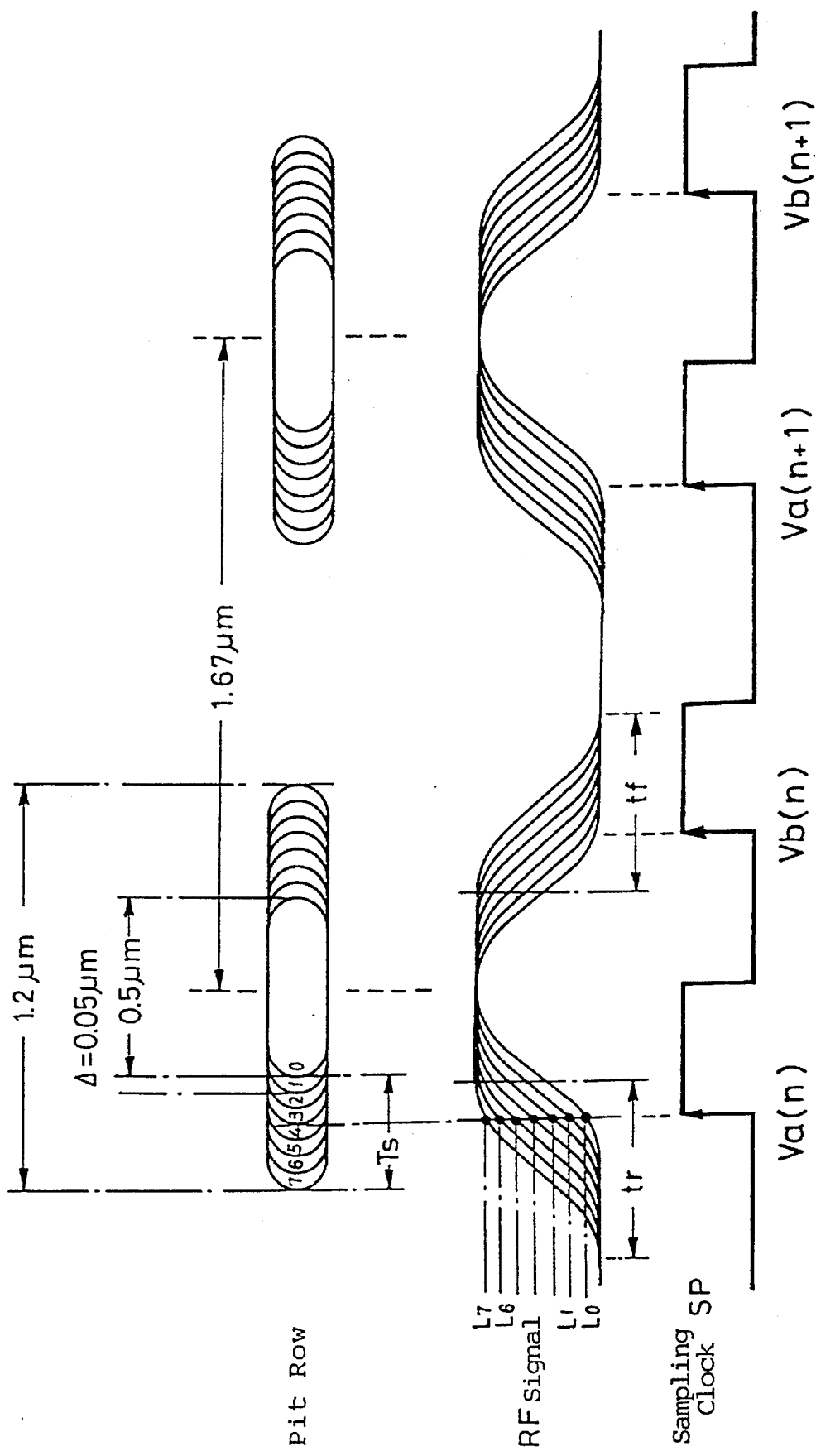
FIG. 2 is a diagram used to explain an example of an arrangement of an information pit in an information recording medium of the present invention.

As shown in FIG. 2, although the edge position of the pit recorded on the optical disk 1 is shifted in a step-wise fashion from the reference position of the center of the pit in response to digital information to be recorded, a shift period Ts ($=\Delta \times 7$) thereof is set in a range corresponding to a period smaller than the leading edge period tr or trailing edge period tf which is a transition period (period other than the stationary state in which data becomes 0 level or saturated level) of an RF signal (reproduced signal) determined depending on the transfer characteristic of the optical detection system.

The above-mentioned RF signal is output from a pickup 3 of a reproducing apparatus which will be described later on, and the transition period is determined by the transfer characteristic of the pickup 3. It is customary that a transfer characteristic of the optical system is defined by an MTF (Modulation Transfer Function) which is an absolute value of its transfer function (OTF: Optical Transfer Function). This MTF is determined depending on a numerical aperture NA of a lens and a wavelength λ of a laser.

If the unit shift amount Δ is shifted at the unit amount smaller than 0.05 μm within the above-mentioned shift period Ts, then a recording density can be increased more.

The RF signal is A/D-converted by a sampling clock SP synchronized in phase with the reference position of the center of the pit thus recorded, whereby reproducing levels L0 to L7 corresponding to the shift amounts 0 to 7 of the edge position of the pit can be obtained. The condition that the reproducing levels L0 to L7 can be detected at one sampling timing in the transition period of the RF signal as described above is shift period Ts ≦ transition period (leading period tr or trailing period tf)

As a sampling timing done by the sample clock SP, it is desired to use a timing corresponding to the center of the shift period Ts. With this timing, it becomes possible to detect the reproducing level over the whole range of the transition period of the RF signal. Further, while the so-called reflection type optical disk 1 in which the pits are formed on the reflection surface of the light beam as the physical concave or convex portions will be described in this embodiment, the present invention is not limited thereto and can be applied to a so-called MO (Magneto Optical) disk in which pits are formed by the partial inversion of a magnetic polarity of a magneto-optical film.

Figure 3:
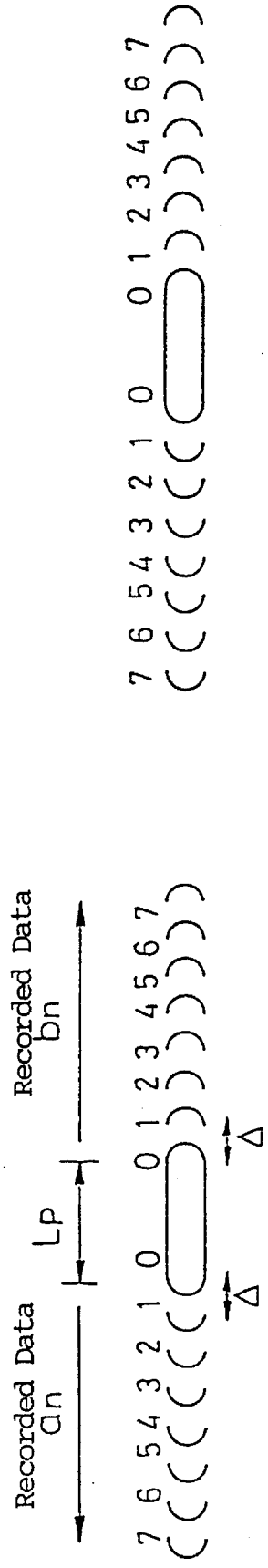
FIG. 3 is a diagram used to explain an example of an arrangement of an information pit in an information recording medium of the present invention.

Information recorded on the optical disk 1 is sampled at the unit of 3 bits and then recorded on n'th bit as recording data an and bn. FIG. 3 shows that state in which the front end edge of the pit is set to any one of 8 shift positions from 0 to 7 in response to recording data an. Similarly, the position of the rear end edge also is set to any one of 8 shift positions from 0 to 7 in response to recording data bn. The pitch Δ of each shift position is 0.05 μm as described before. As a result, when the recording data an and bn are formed at the shift position 0, each pit has a shortest length LP=0.5 μm.

Referring back to FIG. 1, a servo area formed of 5 pits is inserted into data area formed of 44 data pits in which data is recorded. Of 5 pits for servo, two pits are used as education pits P1, P2 and the remaining three pits are used as reference pits P3 to P5. The position of the front end edge of the education pit P2 in the left-hand side of the figure is set to any position M of the shift positions of 8 stages from 0 to 7. Further, the position of the rear end edge in the right-hand side of the figure is set to any position N of the shift positions of 8 stages from 0 to 7.

The position M of the front end edge of the education pit P2 and the position N of the rear end edge thereof are set in the servo area by a regular combination so as to provide different combinations. More specifically, in the first servo area, M and N are set to (0, 0) and (0, 1) in the next servo area. Similarly, there are set regular combinations of (0, 2), (0, 3), . . . , (7, 6), (7, 7). Therefore, in 64 (=8×8) servo areas, there are prepared all possible combinations of positions of the front end edge and the rear end edge of the education pit P2.

Incidentally, the education pit P1 becomes a dummy pit in this case. More specifically, the education data is not formed at the respective ends of the pit P2 and can be formed at the respective ends of the pit P1 from a theory standpoint. However, with such arrangement, since the pit adjacent to the left-hand side of the pit P1 is the data pit of the data area so that the edge position is changed in response to the data. As a result, a degree in which the education pit P1 interferes with the edge of the data area side is changed depending on the value of the education data. Therefore, it becomes impossible to constantly form education data under the constant state as will be described later on. Therefore, according to this embodiment, it is preferable to form education data on the edges of the respective ends of the education pit P2, not on the respective ends of the pit P1. With the above-mentioned arrangement, the edges of the reference pit P4 adjacent to the rear end edge of the education pit P2 and education pit P1 adjacent to the front end edge thereof both remain constant (not changed) as (0, 0) so that, when education data of the education pit P2 is read out, such education data is constantly affected by a constant intersymbol interference. Therefore, it is possible to obtain a constant pattern.

The reference pits P3 to P5 are pits that are used to obtain data of reference position of (0, 0) and (7, 7). From a theory standpoint, this reference data can be formed at edges of the respective ends of, for example, pit P5. However, with the above-mentioned arrangement, the degree of interference from adjacent data region is changed in accordance with recording data similarly to the case that has been described so far with respect to the education pit. Therefore, it is preferable that the reference position data is not formed at the rear end edge of the reference pit P5 in the right-hand side of the figure similarly to the embodiment.

Figure 4:
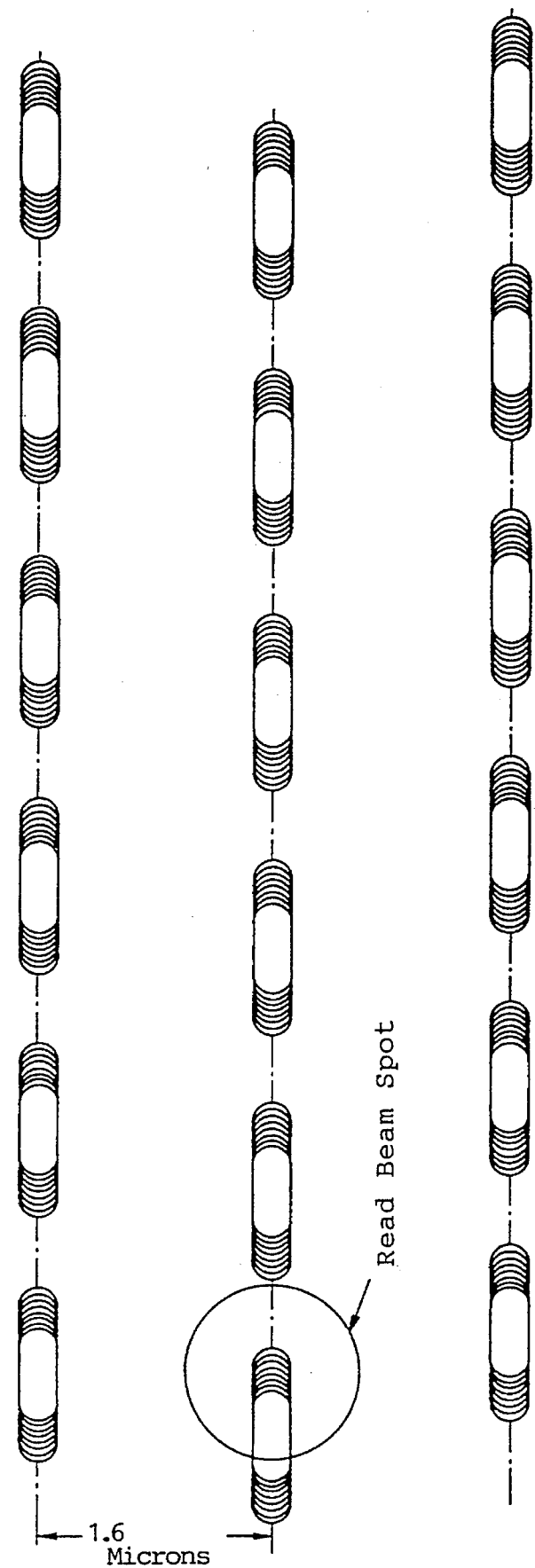
FIG. 4 is a diagram used to explain phases between tracks of the information recording medium of the present invention.

FIG. 4 is a diagram used to explain a planar structure of the optical disk 1 in brief. Since the signal recorded at the track pitch of 1.6 μm is recorded in the CLV mode, the phases of the pit positions are not matched between the adjacent tracks, and this signal is recorded with different phases as shown in the figure.

Figure 5:
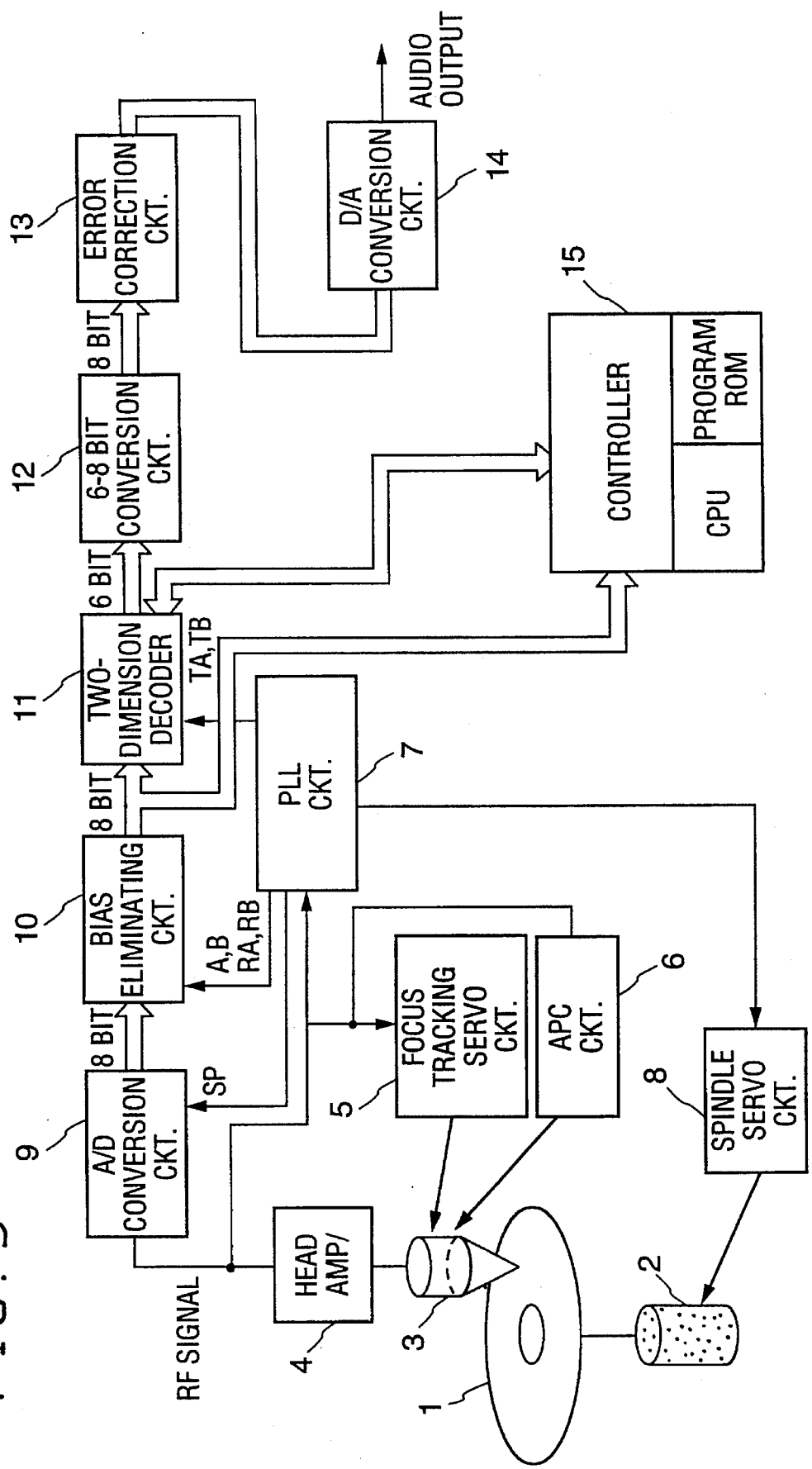
FIG. 5 is a block diagram showing an arrangement of an embodiment of an optical disk reproducing apparatus to which an information reproducing apparatus of the present invention is applied.

FIG. 5 is a block diagram showing an arrangement of an embodiment of an optical disk reproducing apparatus to which the information reproducing apparatus of the present invention is applied. The optical disk 1 is rotated by a spindle motor 2. On this optical disk 1, there is recorded information on the basis of the principle shown in FIGS. 1 and 2. More specifically, digital information is recorded by shifting in a step-wise fashion at least one position of the front end edge and rear end edge of the information pit from a predetermined reference position. Then, servo areas are formed on this optical disk 1 at a constant period and also the education pits P1, P2 and the reference pits P3 to P5 are formed thereon. It is needless to say that a data pit is formed on the data area.

The pickup 3 irradiates the optical disk 1 with a laser beam to reproduce a signal recorded on the optical disk 1 from a reflected-back light thereof. The RF signal output from the optical pickup 3 is amplified by a head amplifier 4 and then supplied to a focus tracking servo circuit 5, an APC circuit 6 and a PLL circuit 7. The focus tracking servo circuit 5 effects the focus error signal and tracking control on the input signal. Also, the APC circuit 6 effects the servo control such that intensity of laser light radiated on the optical disk 1 becomes constant.

The PLL circuit 7 is adapted to extract a clock component from the input signal. While the PLL circuit that is generally utilized in the CD system reproduces a clock by using all RF signals, in the case of this embodiment, a clock is reproduced by using only the RF signal at the portion of the servo area. That is to say, since the portion of the servo area is not modulated by the recorded data, the clock can be reproduced stably without being affected by the influence of the recorded data at all.

Figure 6:
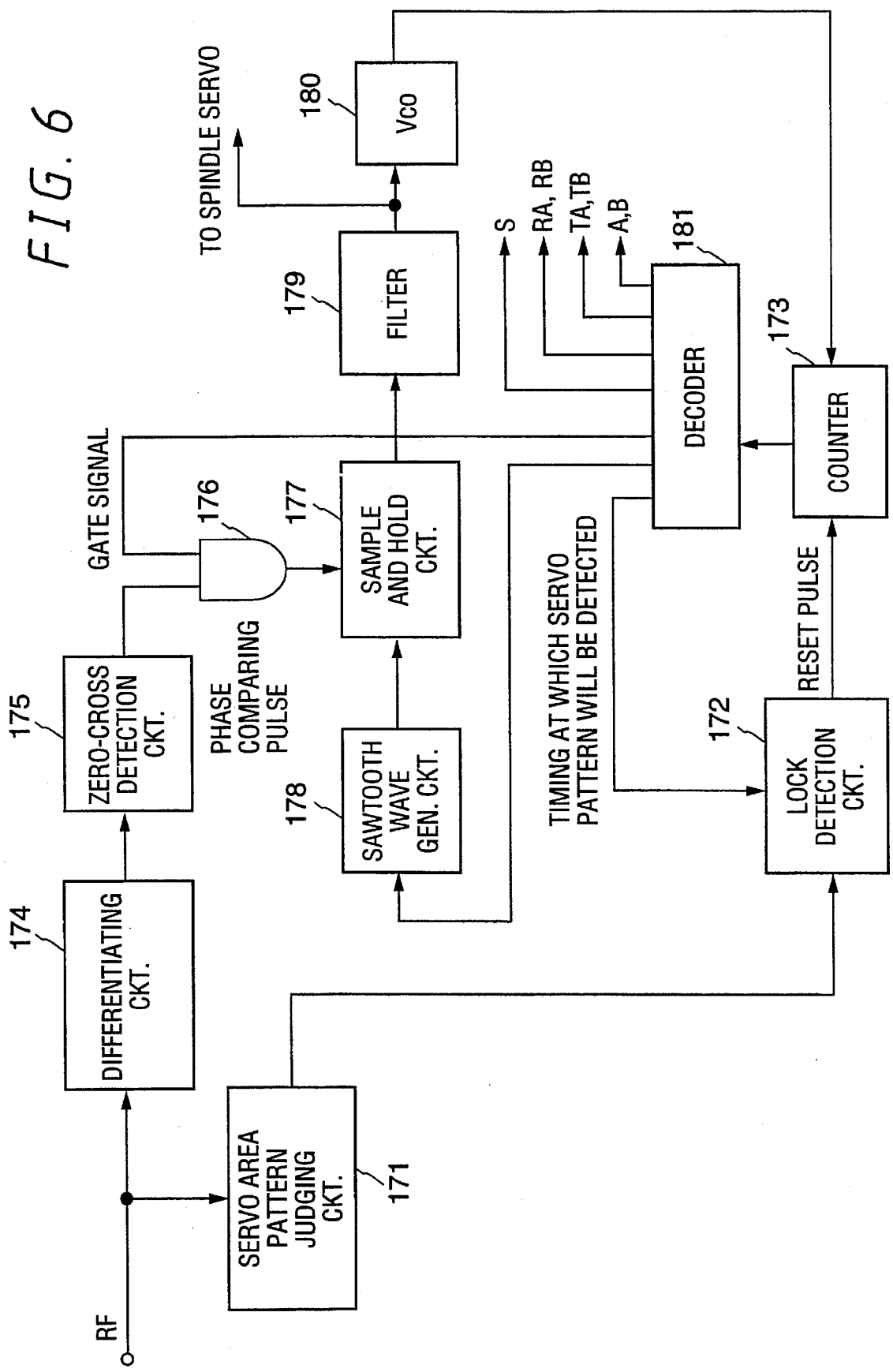
FIG. 6 is a block diagram showing an example of an arrangement of a PLL circuit 7 in the embodiment of FIG. 5.

FIG. 6 is a block diagram showing an arrangement of the PLL circuit 7 that can realize such function. As shown in the figure, when a servo area pattern judging circuit 171 detects a pattern, which is considered to be a servo area, from the RF signal, there is generated a servo area detection pulse. There is the possibility that the same pattern as the servo area will appear in the data area. It is to be understood that this pulse is not always correct. However, assuming that this pulse is correct, then a lock detection circuit 172 supplies a reset pulse to a counter 173 to reset the counter 173.

If this pattern is a correct servo area, then the detection pulse will be output at the same timing. The lock detection circuit 172 detects this fact to determine whether or not the PLL circuit 7 is in the locked state.

If it is determined that the pulse is not the correct detection pulse, then the lock detection output is not produced after a constant time was passed. Therefore, the above-mentioned operation is repeated until the locked state is presented.

After the servo area is detected correctly, the counter 173 is reset at the correct timing so that a timing at which the next servo area appears can be coarsely predicted by decoding a count value of the counter 173.

Using this principle, a timing at which a particular pit existing within the servo area appears is generated from the count value of the counter 173 and is then supplied to an AND gate 176 as a gate signal.

In order to eliminate the influence from the data recorded on both sides of the servo area, the timing of the gate signa is adjusted such that a pit at the central portion of the servo area is selected as much as possible.

Of RF signals differentiated by the differentiating circuit 174 and whose zero-cross points are detected by a zero-cross detection circuit, a signal that is passed through an AND gate 176 become a phase comparing pulse and is then supplied to a sample and hold circuit 177.

The sample and hold circuit 177 detects a time difference (phase error) of a clock that counts up the counter 173 and a particular pit existing in the servo area on the optical disk 1 by momentarily sampling and holding a sawtooth wave generated by a sawtooth wave generating circuit 178 on the basis of the counter 173 at a timing of a particular pit.

This phase error signal that had been passed through a filter 179 is fed back to a VCO (voltage controlled oscillator) as a drive voltage, thereby constructing a PLL loop that can constantly hold a particular pit existing in the servo area on the optical disk 1 and the clock in a correct phase relationship.

A sampling clock SP, a clock A, a clock B, a clock RA, a clock RB, a clock TA and a clock TB that are held at predetermined phase relationships shown in FIG. 13 are generated by decoding the output of the counter 173 by a decoder 181. These clocks are supplied to an A/D converting circuit 9, a bias eliminating circuit 10 and a two-dimension decoder 11 as shown in FIG. 5.

A spindle servo circuit 8 in FIG. 5 controls the spindle motor 2 such that the drive voltage of the VCO in FIG. 6 becomes a constant value constantly. Thus, the optical disk 1 is rotated at a constant angular velocity.

On the other hand, the RF signal output from the head amplifier 4 is input to the A/D converting circuit 9, in which it is A/D-converted into digital data (reproducing level) indicative of the levels of 256 stages of 8 bits. The 8-bit data is supplied to a bias eliminating circuit 10, in which it is eliminated in bias component and then supplied to a two-dimension decoder 11 and a controller 15. The controller 15 is comprised of a CPU that effects a variety of calculations, a program ROM in which there are stored programs that are executed by this CPU, etc., to thereby execute a mapping processing or the like which will be described later on.

The two-dimension decoder 11 decodes a signal supplied thereto from the bias eliminating circuit 10 and supplies its output to a 6–8 bit conversion circuit 12. The 6–8 bit conversion circuit 12 accumulates 4 sets of input 6-bit data and converts and outputs 3 sets of 8-bit data to an error correction circuit 13. The error correction circuit 13 corrects error of input data and outputs corrected data to a D/A converting circuit 14. The D/A converting circuit 14 converts the input data into an analog signal and outputs the same into an analog audio amplifier.

Figure 7:
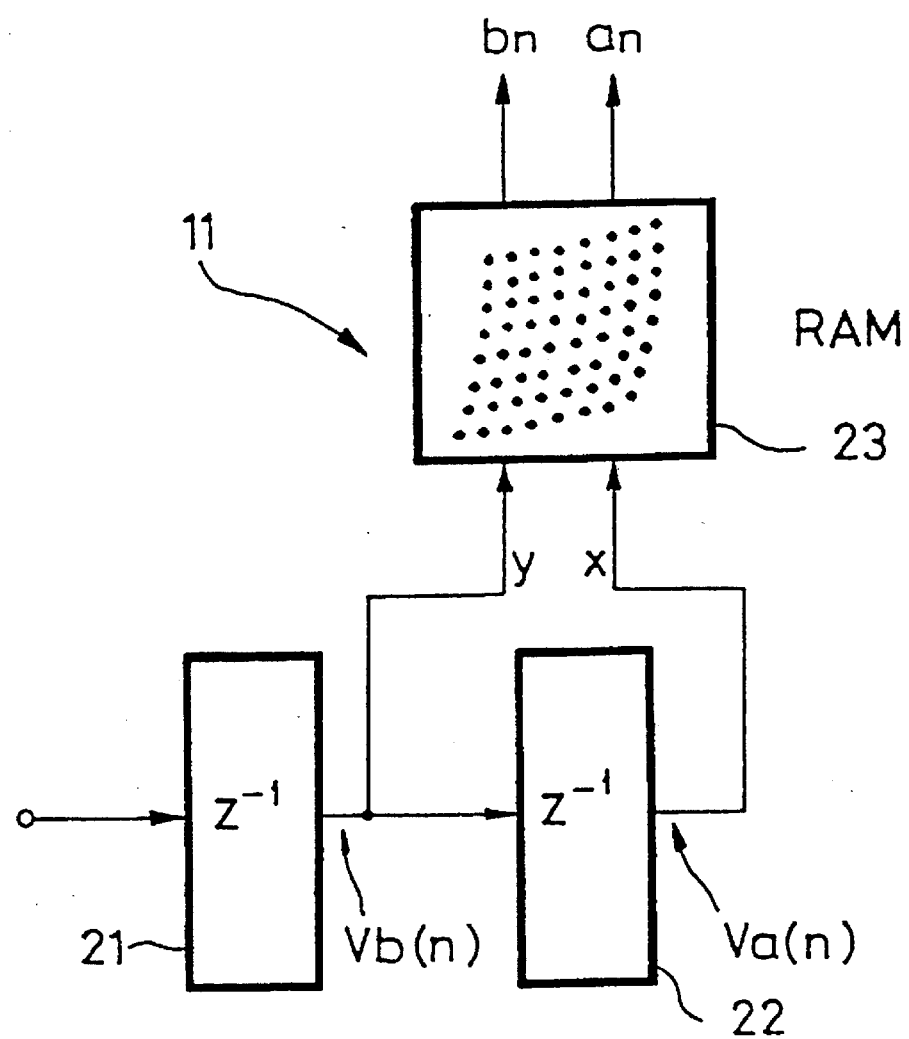
FIG. 7 is a block diagram showing an example of an arrangement of a two-dimension decoder in the embodiment of FIG. 5.

The two-dimension decoder 11 is constructed as, for example, shown in FIG. 7. More specifically, the 8-bit reproduced level data supplied from the bias eliminating circuit 10 is sequentially delayed by delay circuits 21 and 22. Then, data output from the delay circuit 21 of the first stage and the data delayed by the delay circuit 22 of the succeeding stage are output to a RAM 23 as address data. The RAM 23 reads out 6-bit decoded data written in addresses corresponding to address data supplied thereto from the delay circuits 21 and 22 and output the same to the 6–8 bit conversion circuit 12.

Figure 8:
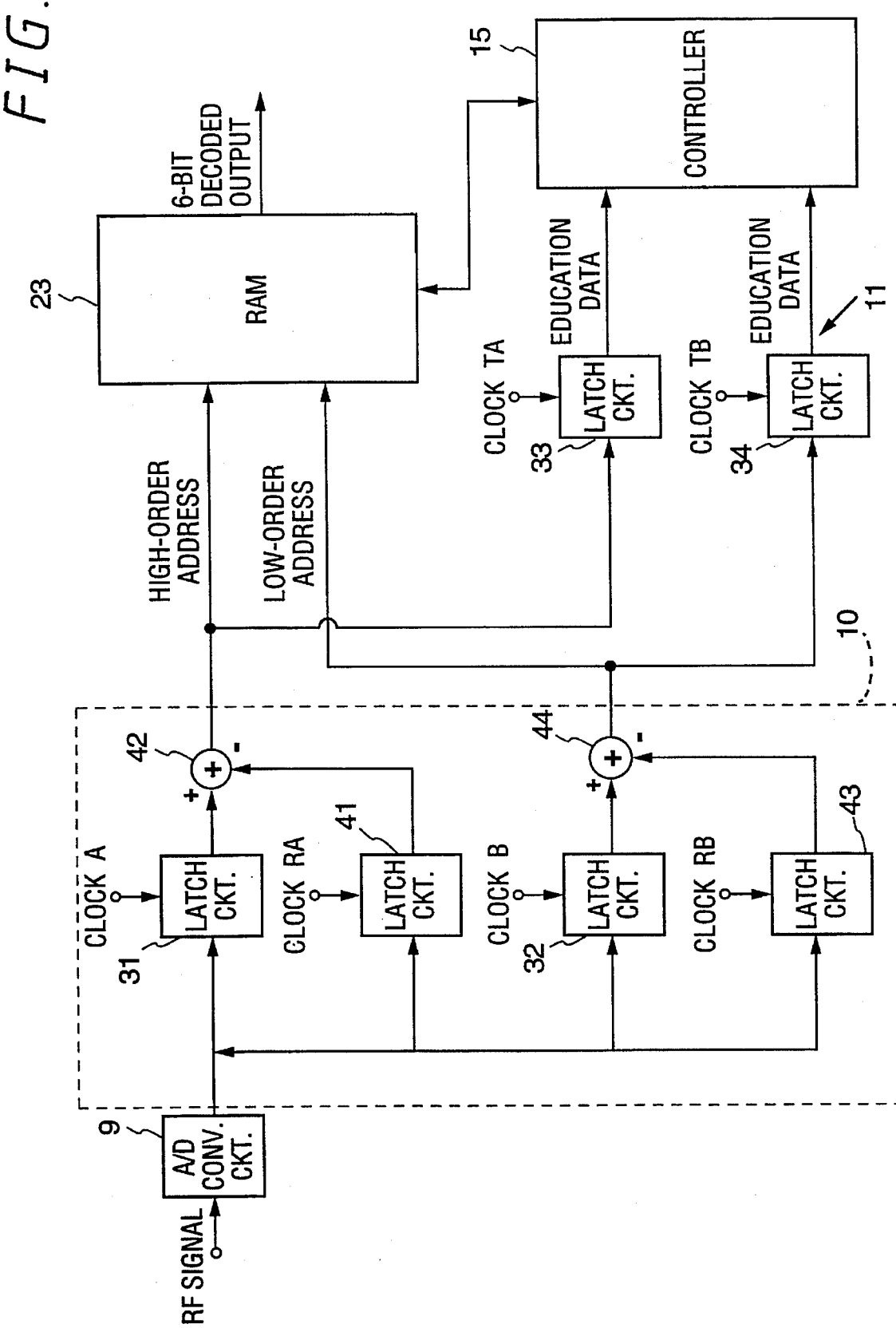
FIG. 8 is a block diagram showing an example of arrangements of a bias eliminating circuit 10 and the two-dimension decoder 11 in the embodiment of FIG. 5.

FIG. 8 shows more fully arrangements of the bias eliminating circuit 10 and the two-dimension decoder 11. That is to say, in this embodiment, the 8-bit data output from the A/D converter circuit 9 is supplied to latch circuits 31 and 32 and also supplied to latch circuits 41 and 43 that construct the bias eliminating circuit 10 together with subtracting circuits 42, 44. The subtracting circuit 42 subtracts data latched in the latch circuit 41 from the data latched in the latch circuit 31, and the subtracting circuit 44 subtracts the data latched in the latch circuit 43 from the data latched in the latch circuit 32.

Outputs of the subtracting circuits 42, 44 are supplied to the RAM 23 as 8-bit high-order address and 8-bit low-order address. Further, the latch circuits 33, 34 latch 8-bit education data supplied thereto from the subtracting circuits 42, 44 at a predetermined timing and output the latched education data to the controller 15. The controller 15 is programmed in advance so that education data are formed as pattern data so as to be mapped on the RAM 23.

Operation of the above-mentioned embodiment will be described and prior to such description, a principle for reading out the shift position of the information pit in this embodiment will be described.

Figure 9:
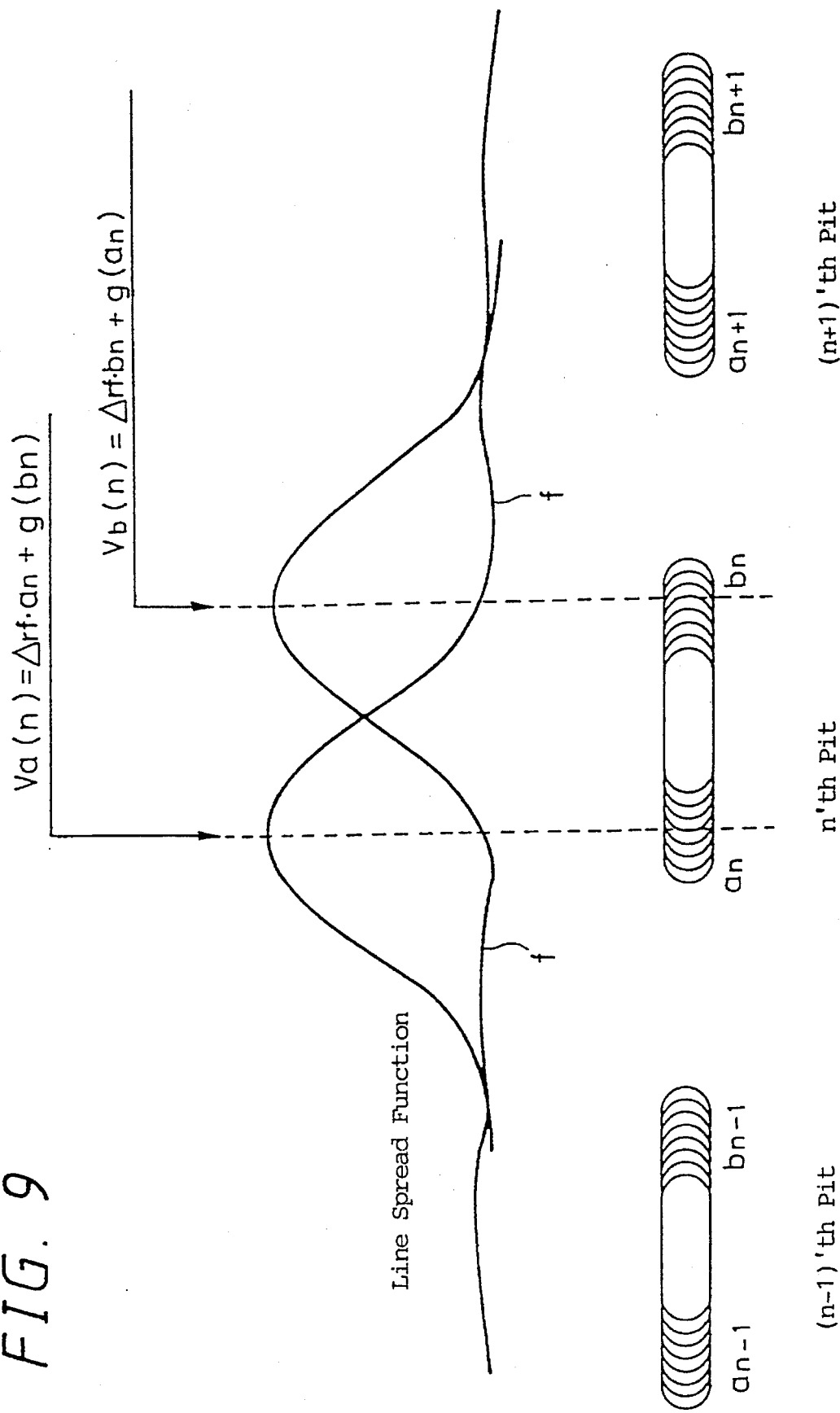
FIG. 9 is a diagram used to explain an intersymbol interference between adjacent edges.

Assuming that pits are spaced apart with a sufficient distance and that an intersymbol interference from adjacent pits is ignored, then output data (reproducing levels) of the A/D converting circuit 9 in the shift periods of the front end edge and the rear end edge of the n'th pit are Va(n) and Vb(n), as shown in FIG. 9. Va(n) and Vb(n) indicate the levels of the RF signal and can be expressed by the following equations:

$$Va(n) = \Delta rf \times an + ga(bn)$$

$$Vb(n) = \Delta rf \times bn + gb(an)$$

Here, $\Delta rf$ represents values which result from multiplying the unit shift amount $\Delta$ with a constant k, and ga(bn) and gb(an) represent nonlinear functions expressing the intersymbol interference between the two edges. These values are increased as the recording density is increased (i.e., as the two edges become close). The decoding of data is such that these simultaneous equations are solved and the recorded signals an, bn are calculated from the observed Va(n) and Vb(n).

Incidentally, the above-mentioned nonlinear function is coarsely obtained on the basis of a line spread function (Line spread function) f shown in FIG. 9. This line spread function f is determined by a distribution of intensity of a reflected light from the reflection surface of the optical disk 1. The line spread function is described more in detail in "APPLIED OPTICS/Vol.26, No.18/15 September 1987 P.3961 to P.3973".

These signals an and bn can be grasped as a pattern recognition problem on a two-dimensional space. More specifically, for all combinations of (an, bn), there are carried out the calculation of the above-mentioned equations. Then, when the resultant Va(n) is plotted as a value of the X axis and Vb(n) is plotted as a value of the Y axis on the two-dimension space, then values that Va(n) and Vb(n) can take are expressed as information points shown in FIG. 10. On this two-dimension plane, the functions ga(bn) and gb(an) expressing the influence of the intersymbol interference are expressed as position distortions of the information points. That is to say, when the functions ga(bn) and gb(an) are 0 (when there occurs no intersymbol interference), information points are located at the positions (lattice points) (reference points) at which lines shown by broken lines in FIG. 10 cross each other. However, in actual practice, there occur intersymbol interference functions gb(an), ga(bn) which become monotone increase functions as, for example, shown in FIG. 11. As a result, as shown in FIG. 10, information points shown by solid circles in the figure are displaced from the lattice points (reference points).

Figure 12A:
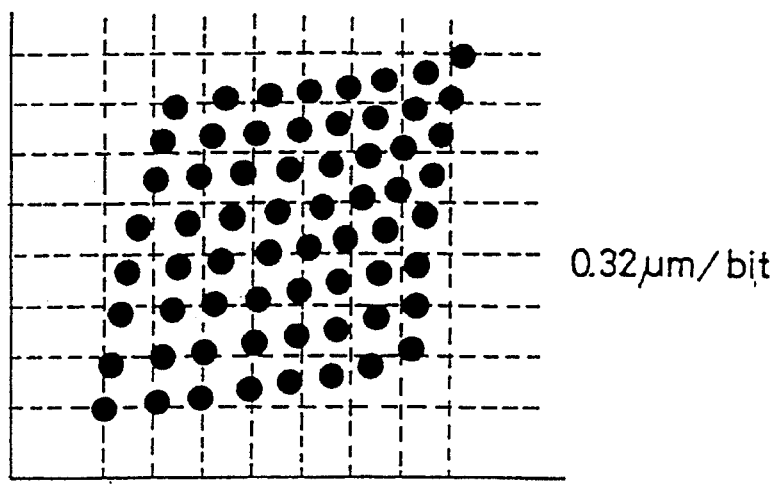
FIGS. 12A–12C are diagrams used to explain a relationship between the influence of the adjacent edges and the linear density.
Figure 12B:
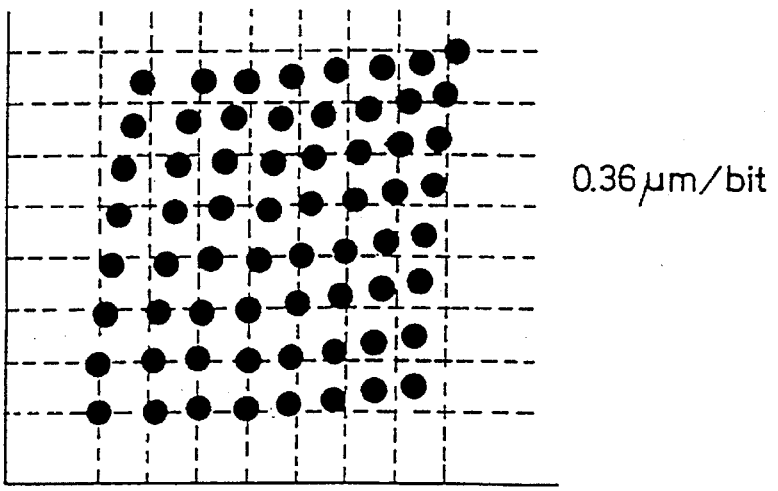
Figure 12C:
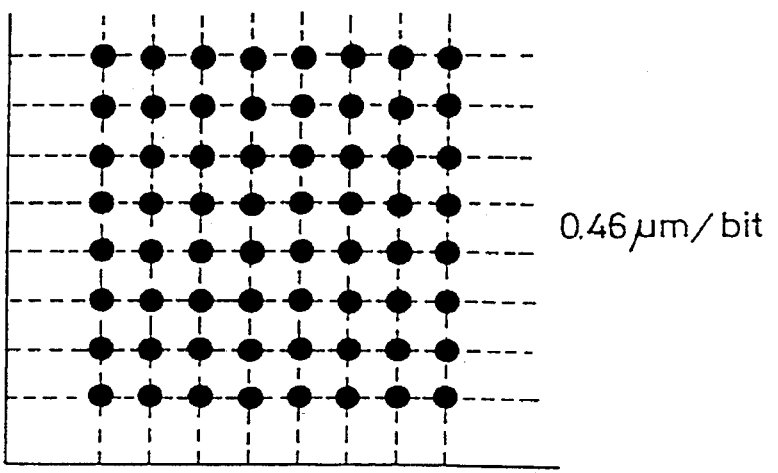

Because this displacement occurs due to the intersymbol interference, this displacement becomes large as the intersymbol interference becomes large. More specifically, FIG. 12A shows a displacement (distortion) obtained when the linear recording density is 0.32 μm/bit and FIGS. 12B and 12C show distortions obtained when the wiring recording density is 0.36 μm/bit or 0.46 μm/bit. Therefore, it is to be understood that the distortion becomes large as the linear recording density becomes small (as the density is increased).

Figure 10:
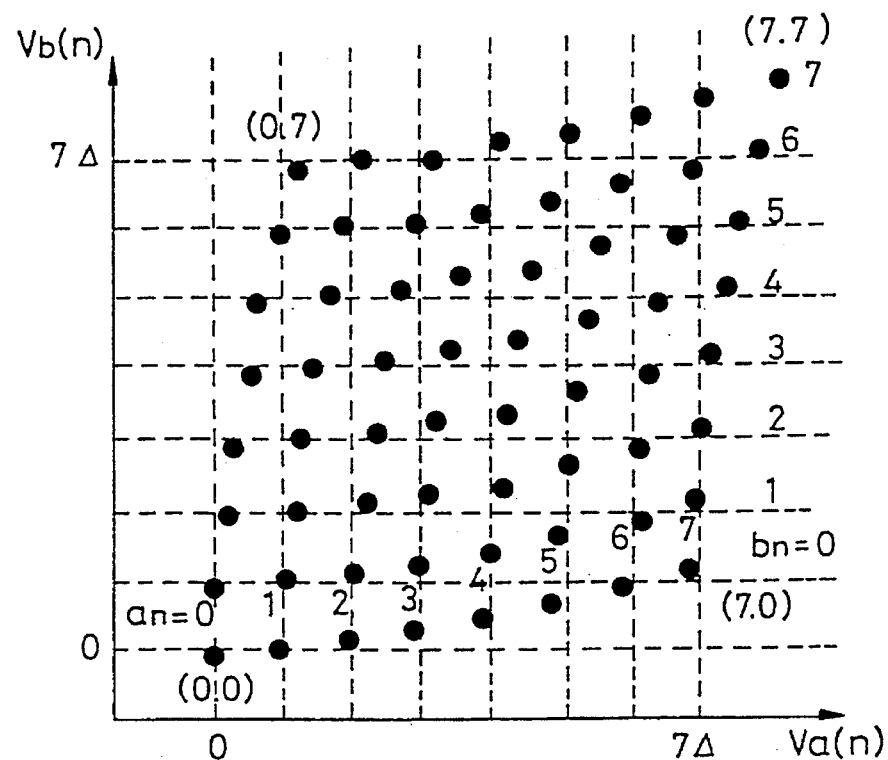
FIG. 10 is a diagram used to explain a principle of a mapping of reference points on a RAM 23 of FIG. 8, FIGS. 11A and 11B are diagrams used to explain functions indicative of the influences of the adjacent edges.
Figure 11A:
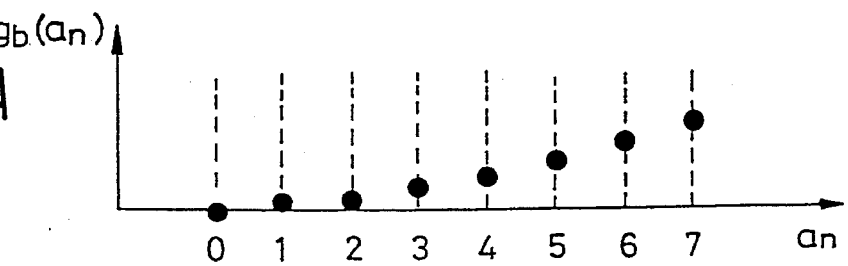
Figure 11B:
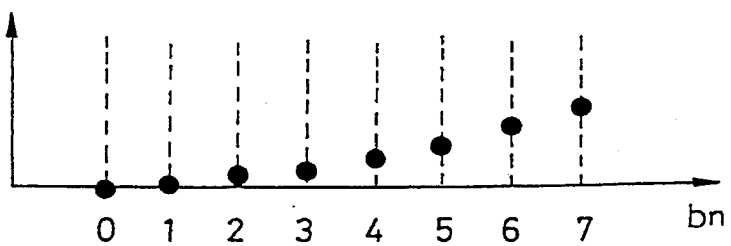

More specifically, education data recorded on the above-mentioned education pit P2 is reproduced and the information point defined by the reproducing level is mapped on the RAM 23 as a reference point as shown by the solid circles in FIG. 10. Then, information point that is obtained when data is read out from the data pit is plotted on the RAM 23 and it is determined that the nearest reference point is a reference point corresponding to the information point. Then, the edge position (an, bn) indicated by the reference point is output as the edge position of the read-out information pint.

Mapping operation of reference points on the RAM 23 will be described initially with reference to a timing chart of FIG. 13.

The pickup 3 reproduces a signal recorded on the optical disk 1. This reproduced RF signal is supplied through the head amplifier 4 to the A/D converter circuit 9, in which it is A/D-converted at a timing of a leading edge of a sampling clock SP (FIG. 13C). Digital data output from the A/D converter circuit 9 is supplied to the latch circuits 31, 32, 41, 43. These latch circuits are respectively supplied with a clock A (FIG. 13D), a clock B (FIG. 13E), a clock RA (FIG. 13H) and a clock RB (FIG. 13I).

The clock A, the clock B, the clock RA, the clock RB, a clock TA (FIG. 13F) and a clock TB (FIG. 13G) are those generated by the PLL circuit 7. As is clear from FIG. 13, the clock A and the clock B are generated immediately after the timings at which the front end edge and the rear end edge of each pit are sampled. Also, the clocks RA and RB are generated at the timing in which the reference position data (0, 0) of the reference pits P3 of respective servo areas are generated.

Accordingly, in the latch circuits 41 and 43, there are latched the reference position data (0, 0) of the front edge and the rear edge of the reference pit P3 in the previous servo area. When the education data of the front end edge and the rear end edge of the education pit P2 are latched by the latch circuits 31 and 32, the subtracter 42 subtracts the latched data of the latch circuit 41 from the latched data of the latch circuit 31. Similarly, the latched data in the latch circuit 43 is subtracted from the data latched by the latch circuit 32.

More specifically, the subtracting circuits 42 and 44 output a level difference between the position M (M is any one of from 0 to 7) of the education pit P2 and the position 0. Further, the subtracting circuit 44 outputs a level difference between the position N (N is any one of values from 0 to 7) and the position 0. In this way, a DC component (bias component) of the reproduced signal is eliminated by subtracting the levels at the position 0. Then, the data whose DC component is eliminated is supplied to the latch circuits 33 and 34, respectively. The latch circuits 33 and 34 latch this data at the timing at which the clocks TA and TB are input. In other words, the latch circuits 33 and 34 output the education data whose DC component is eliminated to the controller 15.

It is needless to say that absolute level of data at each shift position can be latched without subtracting the values of the reference position data (0, 0). However, if so, then the absolute level of each shift position is changed due to the fluctuation of the disk 1 and the optical system or the like. Therefore, it becomes impossible to judge each shift position. For this reason, it is preferable to reduce the influence of the fluctuations of the disk 1 and the optical system by subtracting the values of the reference position data (0, 0) as described above.

The controller 15 effects the mapping operation on the RAM 23 on the basis of the information points defined by the two coordinates as reference points as education data input thereto from the latch circuit 33, i.e., a low-order address in FIG. 8 and as education data input thereto from the latch circuit 34, i.e., a high-order address in FIG. 8.

Figure 14:
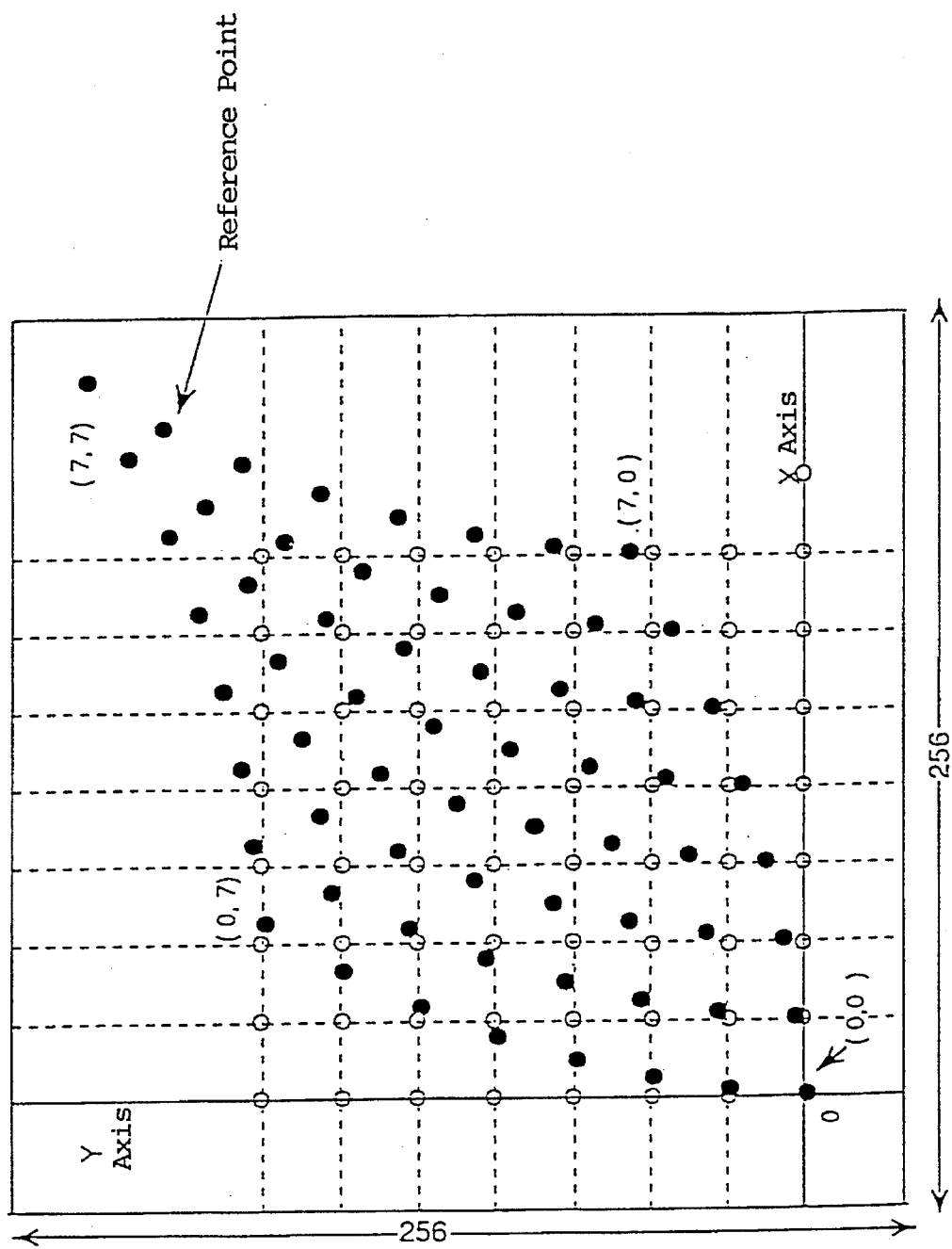
FIG. 14 is a diagram used to explain the mapping of reference points in the RAM 23 of FIG. 8.

When the mapping operation is carried out in accordance with education data from 64 servo areas, as shown in FIG. 14, 64 reference points are mapped on the RAM 23 at its predetermined storage points.

Figure 15:
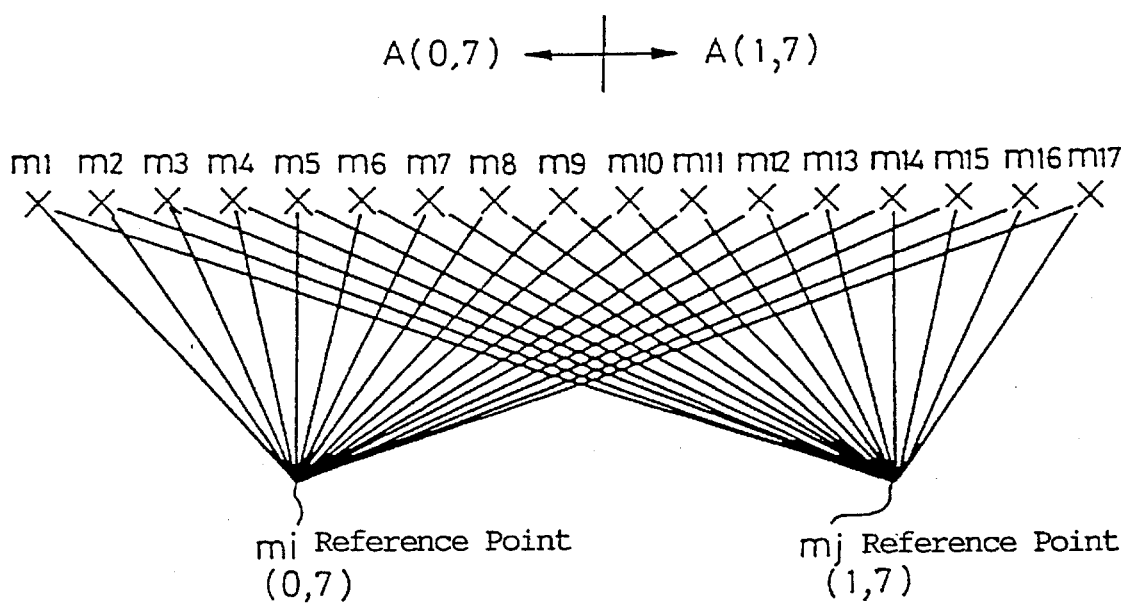
FIG. 15 is a diagram used to explain the mapping of reference points relative to other storage points in the RAM 23 of FIG. 8.

Then, the controller 15 calculates the distances of the respective storage points on the RAM 23 relative to the storage points in which the 64 storage points are stored. That is, as shown in FIG. 15, for example, distances of storage points m1 to m17 relative to a storage point mi in which a reference point (0, 7) is stored are calculated. Similarly, distances of the storage points m1 to m17 relative to a storage point mj in which a reference point (1, 7) is stored are also calculated. Then, in the respective storage points, there are stored the same data as the reference point stored in the nearest storage point of the storage points at which the reference points are stored.

Since the quantization bit number per sample in the A/D converter circuit 9 is 8 bits, the output thereof has the levels of 256 stages. Accordingly, the RAM 23 has 256 addresses as the abscissa and ordinate addresses. In other words, the RAM 23 is comprised of 256×256 storage points. Of these storage points, the reference points are stored in predetermined reference points as shown in FIG. 14.

With respect to other storage points in which the reference point is not stored, distance between them and the storage points at which the reference points are already stored are calculated and the same data as the reference point stored in the nearest storage point is stored in each of the storage points. In the embodiment shown in FIG. 15, of the storage points m1 to m17, the storage points m1 to m9 are nearest to the storage point mi (reference point (0, 7)) and the storage points m10 to m17 are nearest to the storage point mj (storage point (1, 7)). Accordingly, the data of the reference point (0, 7) is written in the storage points m1 to m9. That is to say, these storage points are used as an area A (0, 7) corresponding to the reference point (0, 7). On the other hand, data at the reference point (1, 7) are written in the storage points m10 to m17. That is to say, these storage points are set to the area A (1, 7) corresponding to the reference point (1, 7).

Figure 16:
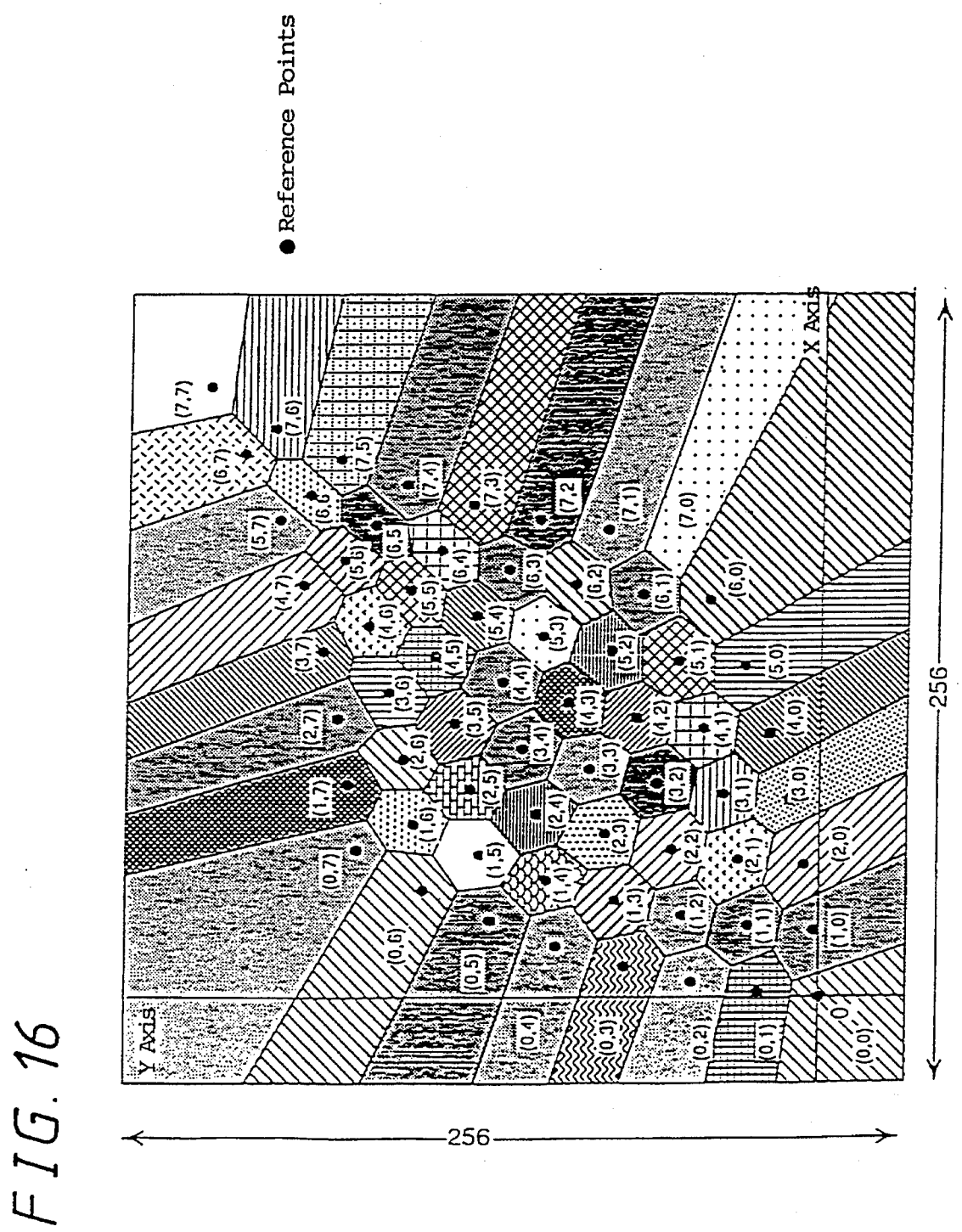
FIG. 16 is a diagram used to explain the mapping state of reference points relative to all storage points in the RAM 23 of FIG. 8.

As described above, data at the reference points are written in the 256×256 storage points so that areas on the RAM 23 corresponding to the respective reference points are presented as shown in FIG. 16. In the storage points included in respective areas A (i, j) are stored data at the reference points (i, j).

Figure 17:
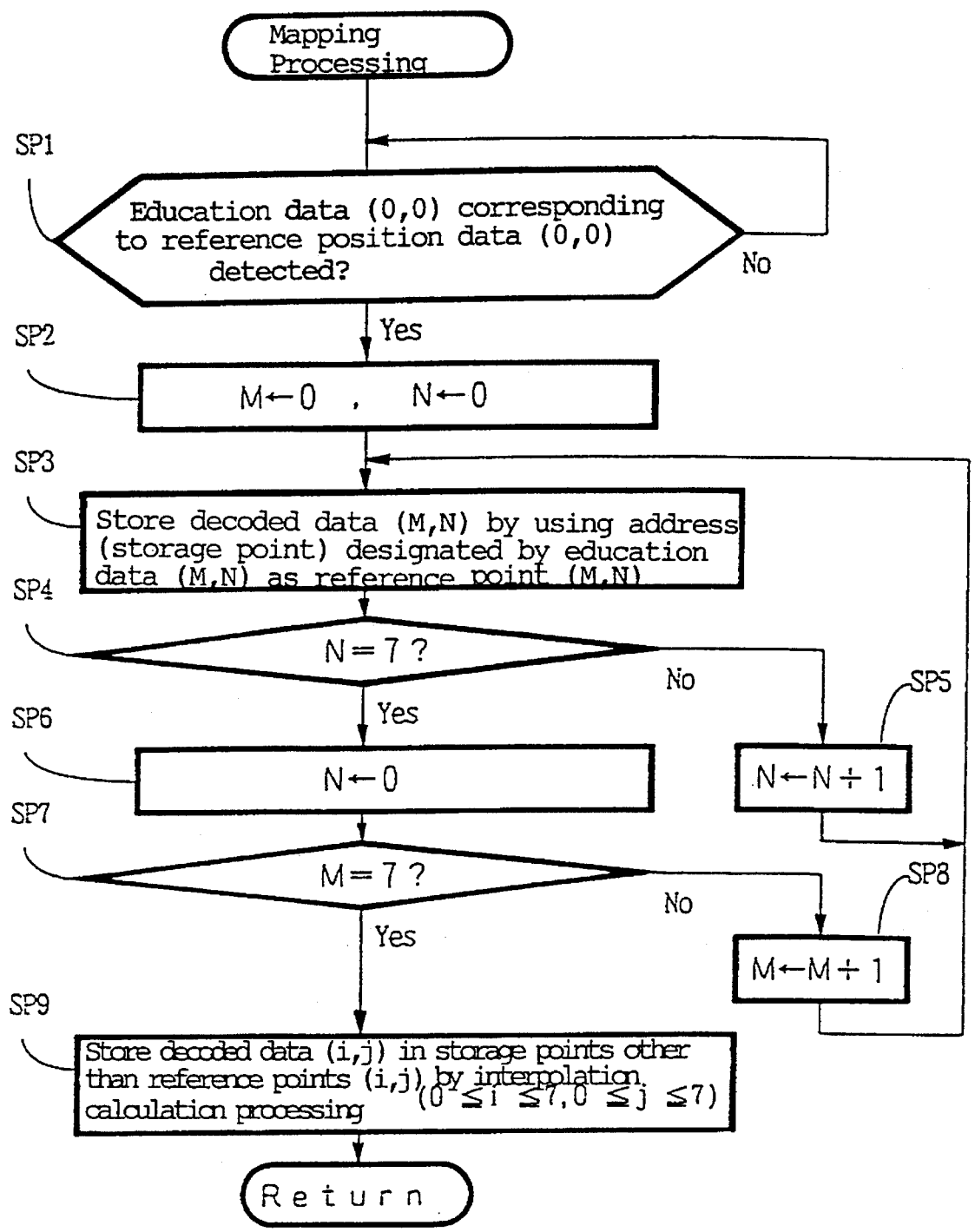
FIG. 17 is a flowchart to which references will be made in explaining the procedure of the mapping processing done by a controller 15 of FIG. 8, FIGS. 18A–18G are timing charts used to explain operation in a data area in the embodiment of FIG. 8.

A flowchart of the mapping processing done by the above-mentioned controller 15 is illustrated in FIG. 17.

As described before, the position M of the front end edge and the position N of the rear end edge of the education pit P2 of each servo area of the optical disk 1 are set to different combinations. These education data (M, N) are regularly set in response to the insertion position relative to the data area in a predetermined order. More specifically, the education data are set to (0, 0) in the first servo area, and (0, 1) in the next servo area. In a like manner, the education data are set to (0, 2), (0, 3), . . . , (7, 6), (7, 7).

Accordingly, in step SP shown in FIG. 17, education data (0, 0) corresponding to the reference position data (0, 0) are sequentially from the incoming servo areas. Then, when the first servo area is detected, the processing proceeds to step SP2, whereat M and N are set. Then, the processing proceeds to step SP3. In step SP3, decoded data (0, 0) is stored by using the address (storage point) designated by the education data (0, 0) on the RAM 23 as the reference point (0, 0). Thereafter, steps SP3 to SP8 are repeated similarly, thereby storing decoded data (0, 1), . . . , (7, 7) in addresses (storage points) designated by the education data (0, 1), . . . , (7, 7) on the RAM 23.

Thereafter, the processing proceeds to step SP9, whereat decoded data (i, j) are stored in storage points other than the reference points (i, j) by the above-mentioned interpolation calculation processing.

The above-mentioned mapping processing is executed by the controller 15 as the initialization operation each time different optical disks 1 are loaded onto the reproducing apparatus.

Operation in the data area will be described with reference to a timing chart of FIG. 18. In response to pit rows shown in FIG. 18A, an RF signal shown in FIG. 18B is input to the A/D converter circuit 9. Then, the levels of the front end and rear end edges of each pit are sampled in synchronism with the leading edge of a sampling clock SP (FIG. 18C). As shown in FIGS. 18A and 18B, the phase of the RF signal is changed in response to the edge position of the pit.

Then, this sampling clock SP is generated during this edge shift period so that the edge shift position can be detected as the change of the level of the RF signal.

Data of the front end edge of the data pit latched by the latch circuit 31 is calculated in level difference relative to data of the position 0 latched in the latch circuit 41 is calculated and then supplied to the RAM 23 as a low-order address (as address of the abscissa in FIG. 10). Similarly, data of the rear end edge of the data pit latched in the latch circuit 32 is subtracted in level of the data of the position 0 latched in the latch circuit 43 and eliminated in DC component, whereafter it is supplied to the RAM 23 as a high-order address (address of the ordinate in FIG. 10). The RAM 23 reads out and outputs decoded data stored in the addresses defined by the abscissa and the ordinate. As the decoded data, there are written reference points of education data by the above-mentioned mapping process. Accordingly, there are selectively output data (an, bn) of the reference points that are close to the information points.

The 6-bit decoded data (an, bn) output from the two-dimension decoder 11 shown in FIG. 5 is supplied to the 6–8 bit conversion circuit 12, in which it is converted into 8-bit data. More specifically, when an audio signal, for example, is recorded on the optical disk 1, the audio signal is corrected in error at the unit of 8 bits. However, as described above, according to this embodiment, totally 6 bits of 3 bits (shift positions of 8 stages) of the front end edge and 3 bits (shift positions of 8 stages) of the rear end edge are taken as a fundamental unit to record data. More specifically, upon recording, data segmented at the unit of 8 bits is converted into data segmented at the unit of 6 bits in accordance with a predetermined system and data is recorded on the optical disk 1. Therefore, data of the 6-bit unit is converted into original data of the 8-bit unit by the 6–8 bit conversion circuit 12.

This bit conversion circuit is operated such that, after 4 sets of data of the 6-bit unit were decoded, these data are collected and 3 sets of data of the 8-bit data are output.

The 8-bit unit data inversely converted by the 6–8 bit conversion circuit 12 is supplied to the error correction circuit 13, error-corrected by the error correction circuit 13 and then supplied to the D/A converter circuit 14, in which it is D/A-converted. Then, this analog signal is amplified by an analog audio amplifier, not shown, and emanated from a speaker or the like as a reproduced sound.

Figure 19:
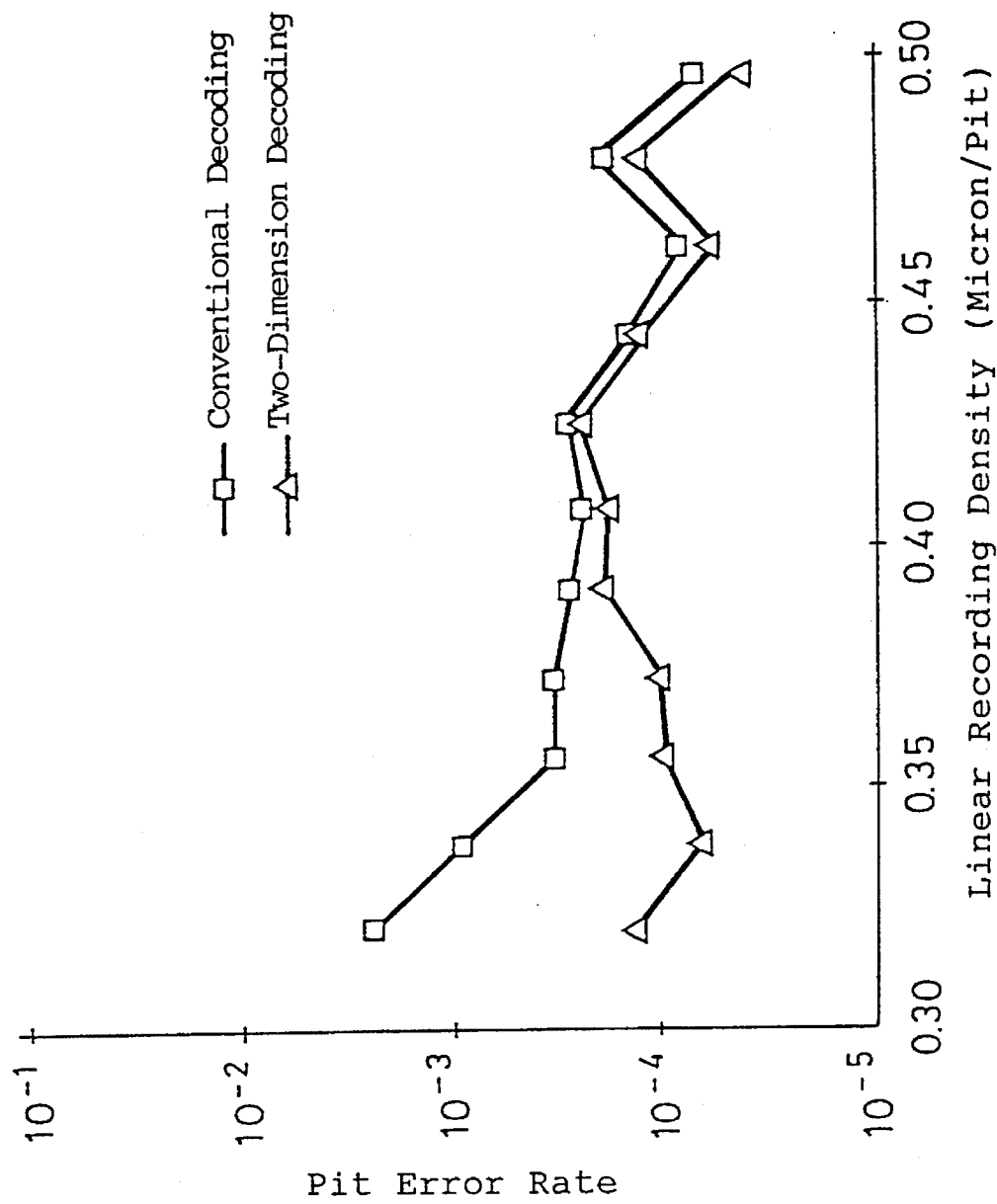
FIG. 19 is a diagram used to explain an error rate realized by the embodiment of FIG. 5.

FIG. 19 shows an error rate of data obtained by the decoding under the condition that the bias eliminating circuit 10 is dis-energized in the above-mentioned embodiment. As shown in the figure, it is to be understood that, as compared with the conventional decoding method (method described in Japanese patent application NO. 3-167585 previously proposed by the present applicant) using the sawtooth wave, the error rate can be reduced when the two-dimension decoding is carried out by using the reference points mapped on the above-mentioned RAM 23. Also, it is to be appreciated that a large effect can be achieved as the linear recording density is increased.

Figure 20:
FIG. 20 is a diagram used to explain an example of other arrangement of the information recording pit.
Figure 21:
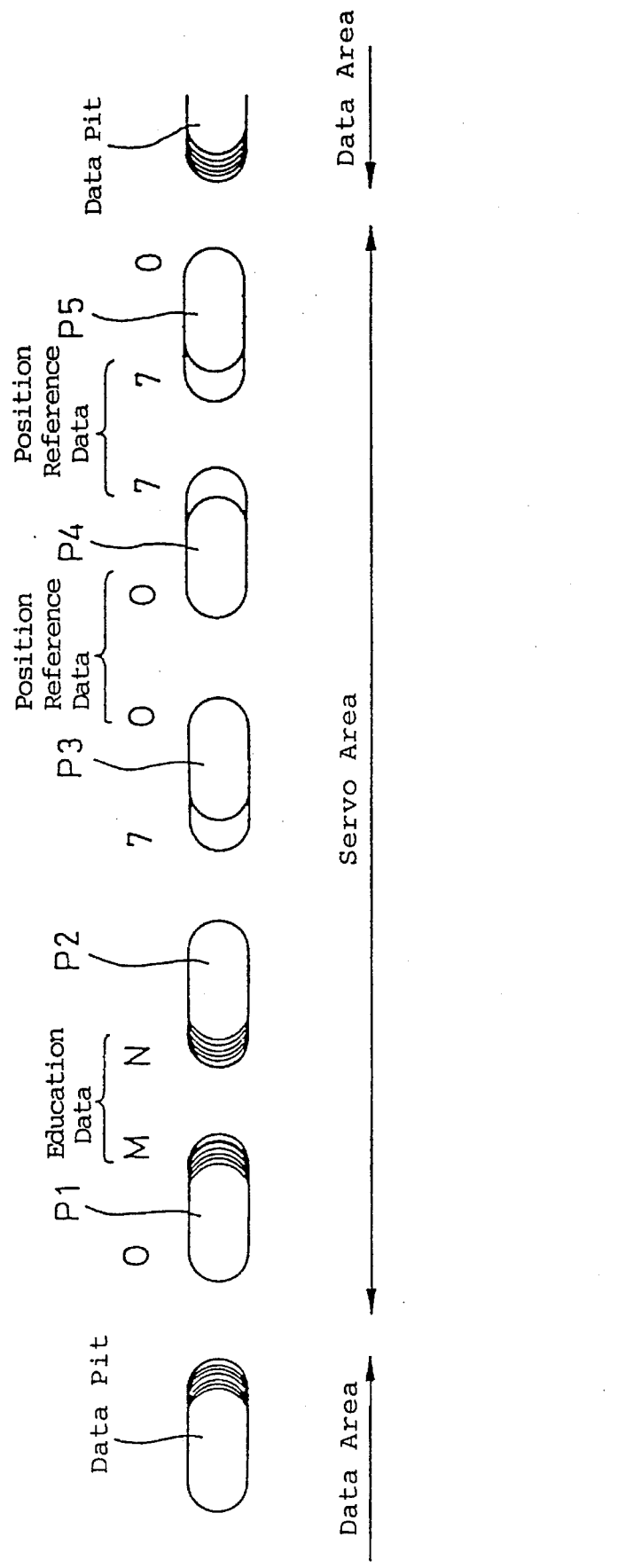
FIG. 21 is a diagram showing an example of an arrangement of a servo area provided when the information recording pit is constructed as shown in FIG. 20.

While data an and bn are recorded on a pair of front edge and rear end edge of one pit as shown in FIG. 1 as described above, data an and bn can be recorded on opposing edges of the adjacent pits as, for example, shown in FIG. 20. In this case, with respect to the education data and the position reference data in the servo area, the education data and the position reference data are recorded on opposing edges of the two pits as shown in FIG. 21. In this embodiment, education data (M, N) is recorded on opposing edges of the two pits P1 and P2, and the position reference data (0, 0) is recorded on opposing edges of the reference pits P3, P4. The position reference data (7, 7) is recorded on respective opposing edges of the reference pits P4 and P5.

In this case, the clock A and the clock B are respectively generated at the rear edge and the front edge of the pit as shown in FIGS. 18F and 18G.

A distance between the information point obtained from the reproduced data and the reference point obtained from the education data is not stored in the RAM 23 in advance but can be calculated at every time. However, if so, then the rapid judgement becomes impossible. Therefore, it is preferable to write such distance data in the RAM 23 in advance like the embodiment.

Figure 22:
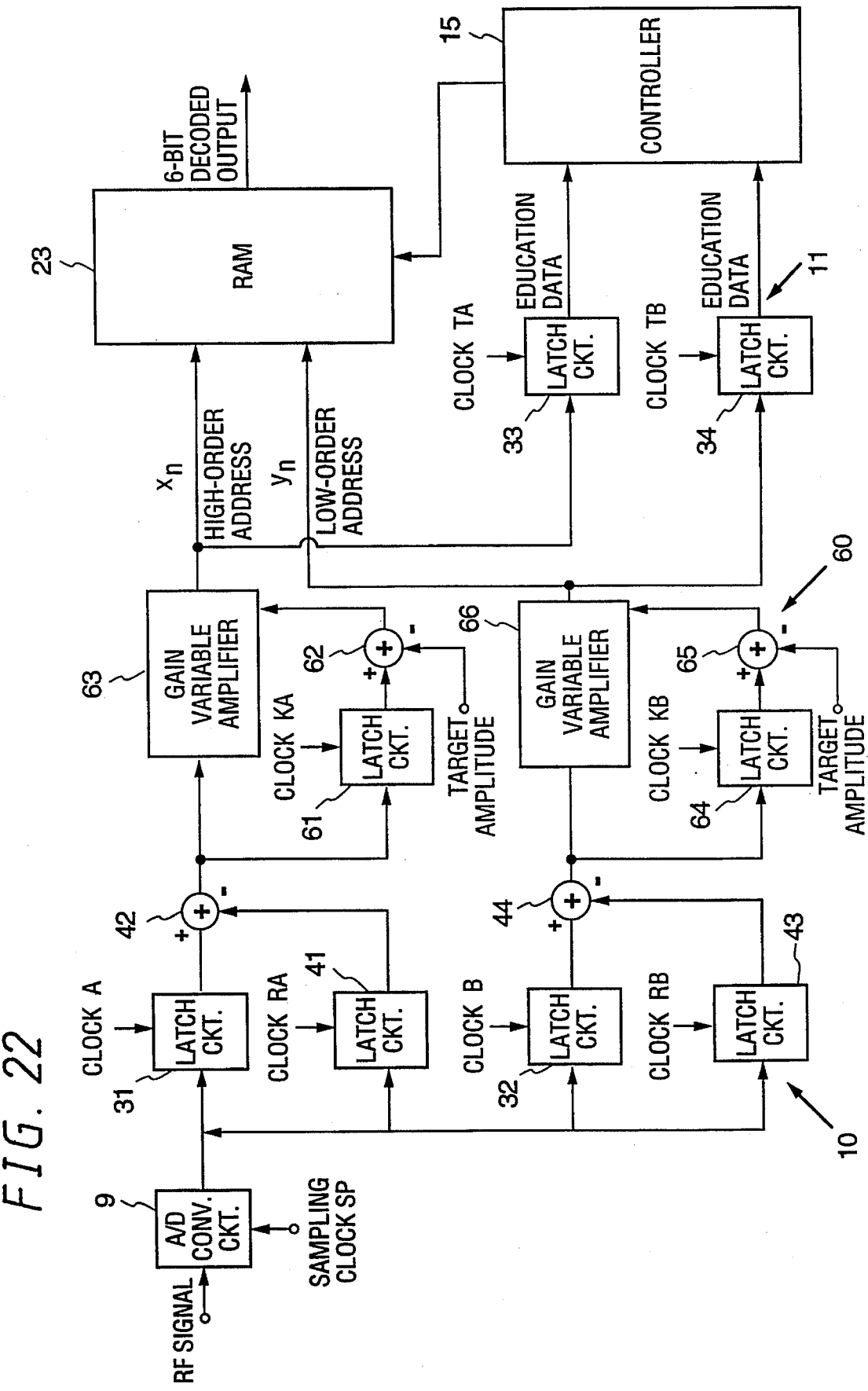
FIG. 22 is a block diagram showing an arrangement of other embodiment of the optical disk reproducing apparatus to which the information reproducing apparatus of the present invention is applied.

While the bias eliminating circuit 10 is located between the A/D converter circuit 9 and the two-dimension decoder 11 in the embodiment shown in FIG. 5, a gain adjusting circuit 5 can be inserted thereinto except the bias eliminating circuit 10. FIG. 22 shows an embodiment of this case. More specifically, the output of the latch circuit 42 is supplied to a gain variable amplifier 63 and also to a latch circuit 61, in which it is latched by a clock KA. An output of the latch circuit 61 is supplied to a subtracting circuit 62, in which a difference between it and a predetermined target amplitude is calculated. Then, an output of the subtracting circuit 62 is supplied to a gain variable amplifier 63.

Similarly, an output of the subtracting circuit 44 is supplied to a gain variable amplifier 66 and also to a latch circuit 64. Data latched by the latch circuit 64 at the timing of the clock KB is supplied to a subtracting circuit 65, in which a target amplitude value supplied from a circuit, not shown, is subtracted from it and then supplied to a gain variable amplifier 66.

The gain variable amplifiers 63, 66 can be formed of ROMs. Outputs of the subtracting circuits 42 and 62 (44 and 65) are input to the ROMs as addresses and data corresponding to those addresses are read out therefrom.

The output of the gain variable amplifier 63 is supplied to the RAM 23 and the latch circuit 33 and the output of the gain variable amplifier 66 is supplied to the RAM 23 and the latch circuit 34. That is to say, a gain adjusting circuit 60 is connected to the rear stage of the bias eliminating circuit 10. A rest of the arrangements is similar to those of FIGS. 5 and 8.

The embodiment of FIG. 22 will be described next with reference to a timing chart of FIG. 23. In the embodiment of FIG. 2, education data is disposed on respective opposing edges of the education pits P1, P2 unlike the embodiments shown in FIGS. 1 and 13. The reference position data (0, 0) is recorded on opposing edges of the reference pits P3, P4 and the reference position data (7, 7) is recorded on the opposing edges of the reference pits P4 and P5 (FIG. 23A).

An RF signal shown in FIG. 23B is obtained in response to the education pits P1, P2 and the reference pits P3 to P5. This signal is A/D-converted by the A/D converter circuit 9 at a timing of a sampling clock SP shown in FIG. 23C. This data is latched in the latch circuit 31 at a timing of a clock A (FIG. 23D) and then latched by the latch circuit 32 at a timing of a clock B (FIG. 23E). Further, the data is latched by the latch circuit 41 at a timing of clock RA (FIG. 23F) and then latched by the latch circuit 43 at a timing of a clock RB (FIG. 23G).

Then, the subtracting circuit 42 subtracts the output of the latch circuit 41 from the output of the latch circuit 31, and the subtracting circuit 44 subtracts the output of the latch circuit 43 from the output of the latch circuit 32. In this way, data that can be prevented from being affected by the DC component can be obtained (the reference point can be disposed at the position of the lattice point at which the straight lines shown by the broken lines cross each other in FIG. 14) similarly as described above.

In this embodiment, the latch circuit 61 latches the output of the subtracting circuit 42 at a timing of a clock KA (FIG. 23H). That is, reference data 7 that is recorded at the rear end edge of the reference pit P4 is latched in the latch circuit 61. A pre-determined target amplitude is subtracted from the output of the latch circuit 61 by the subtracting circuit 62. A difference therebetween is supplied to the gain variable amplifier 63. The gain variable amplifier 63 adjusts the gain of the signal supplied thereto from the subtracting circuit 42 in response to the signal supplied thereto from the subtracting circuit 62. That is to say, therefore, the signal output from the gain variable amplifier 63 is set such that its position of the abscissa direction indicated by the reference point (7, 7) becomes a target amplitude in FIG. 10.

Similarly, a latch circuit 64 latches the output of the subtracting circuit 44 at a timing of a clock KB (FIG. 23I).

More specifically, the position reference data 7 that is recorded at the front end edge of the reference pit P5 is latched in the latch circuit 64. Data latched by the latch circuit 64 is subtracted in target amplitude by a subtracting circuit 65 and then supplied to a gain variable amplifier 66. The gain variable amplifier 66 adjusts the gain of the signal supplied thereto from the subtracting circuit 44 in response to the signal supplied from the subtracting circuit 65. Thus, the signal output from the gain variable amplifier 66 is adjusted so that the position thereof in the ordinate direction shown by the reference point (7, 7) becomes a target amplitude position that is pre-determined in FIG. 10.

As described above, by adjusting the gain by the gain adjusting circuit 60, the reference position (7, 7) shown in FIG. 14 can constantly be located at a predetermined position. Therefore, even when the optical disk 1 has a local fluctuation of characteristic, data can be read out accurately.

Figure 24A:
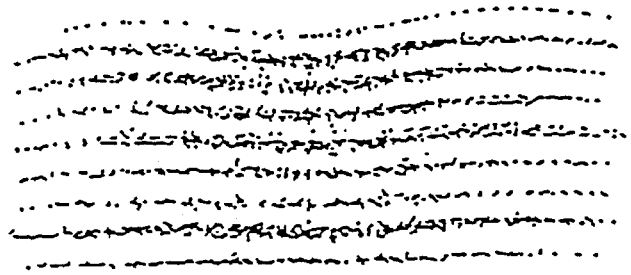
Figure 24B:
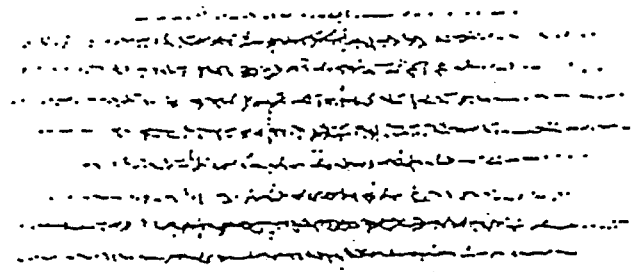

FIG. 24 shows the output of the gain variable amplifier 63 (or 66). FIG. 24A shows such output obtained when the output of the subtracting circuit 62 is not supplied to the gain variable amplifier 63, and FIG. 24B shows such output obtained when that output is supplied thereto. It is to be understood that the level fluctuation is suppressed if the gain is adjusted by the output from the subtracting circuit 62.

Figure 25:
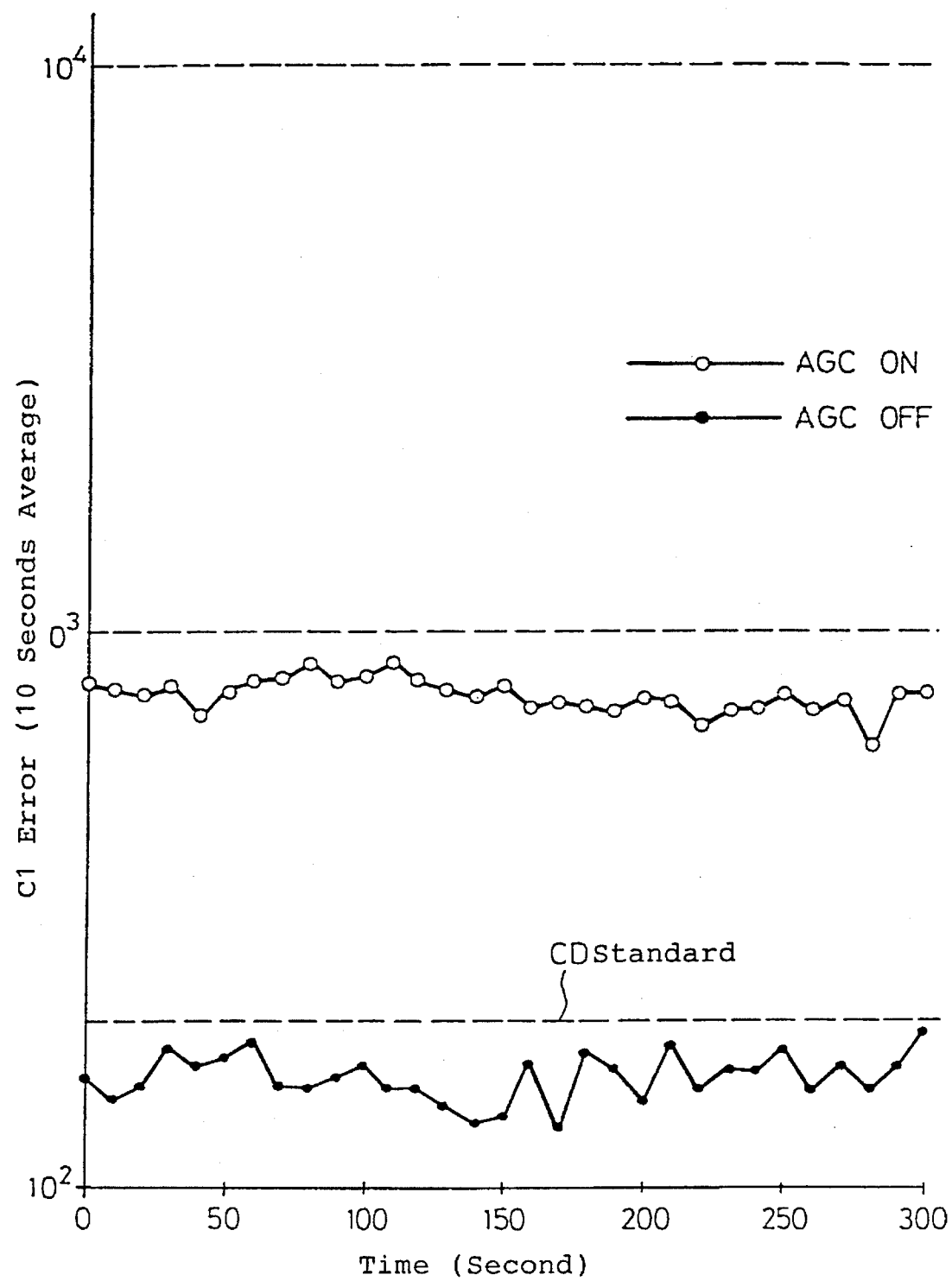
FIG. 25 is a diagram used to explain an error produced situation realized by the embodiment of FIG. 22.

FIG. 25 shows measured results of the number of errors of C1 when the error correction method used in the CD system is applied in the embodiment of FIG. 22. In the figure, solid circles represent measured results obtained when the outputs of the latch circuits 41, 43 are supplied to the subtracting circuits 42, 44 and the outputs of the subtracting circuits 62, 66 are not supplied to the gain variable amplifier 63. In the figure, solid circles show measured results obtained when the outputs of the latch circuits 41, 43 are supplied to the subtracting circuits 42, 44 and the outputs of the subtracting circuits 62, 65 are supplied to the gain variable amplifiers 63, 66. It is to be understood that the latter can reduce the number of resultant errors. Also, it is to be understood that the number of errors can satisfy the CD standard regardless of the fact that the linear recording density is twice that of the CD.

As described above, the reproduced data is processed on the basis of the data recorded on the education pits P1, P2 or the reference pits P3 through P5 so that, if a dropout or the like occurs in these reference data, data cannot be read out accurately. In order to prevent this defect, a circuit is constructed as, for example, shown in FIG. 26. More specifically, in this embodiment, the latch circuits 31, 32 are replaced with FIFOs 71, 72, and the latch circuits 41, 43 are replaced with defect eliminating circuits 73, 74. Further, the latch circuits 61 and 64 are replaced with defect eliminating circuits 82, 84, and FIFOs 81, 83 are inserted into the front stages of the gain variable amplifiers 63, 66. A rest of arrangements is similar to that of the case of FIG. 22.

Figure 27:
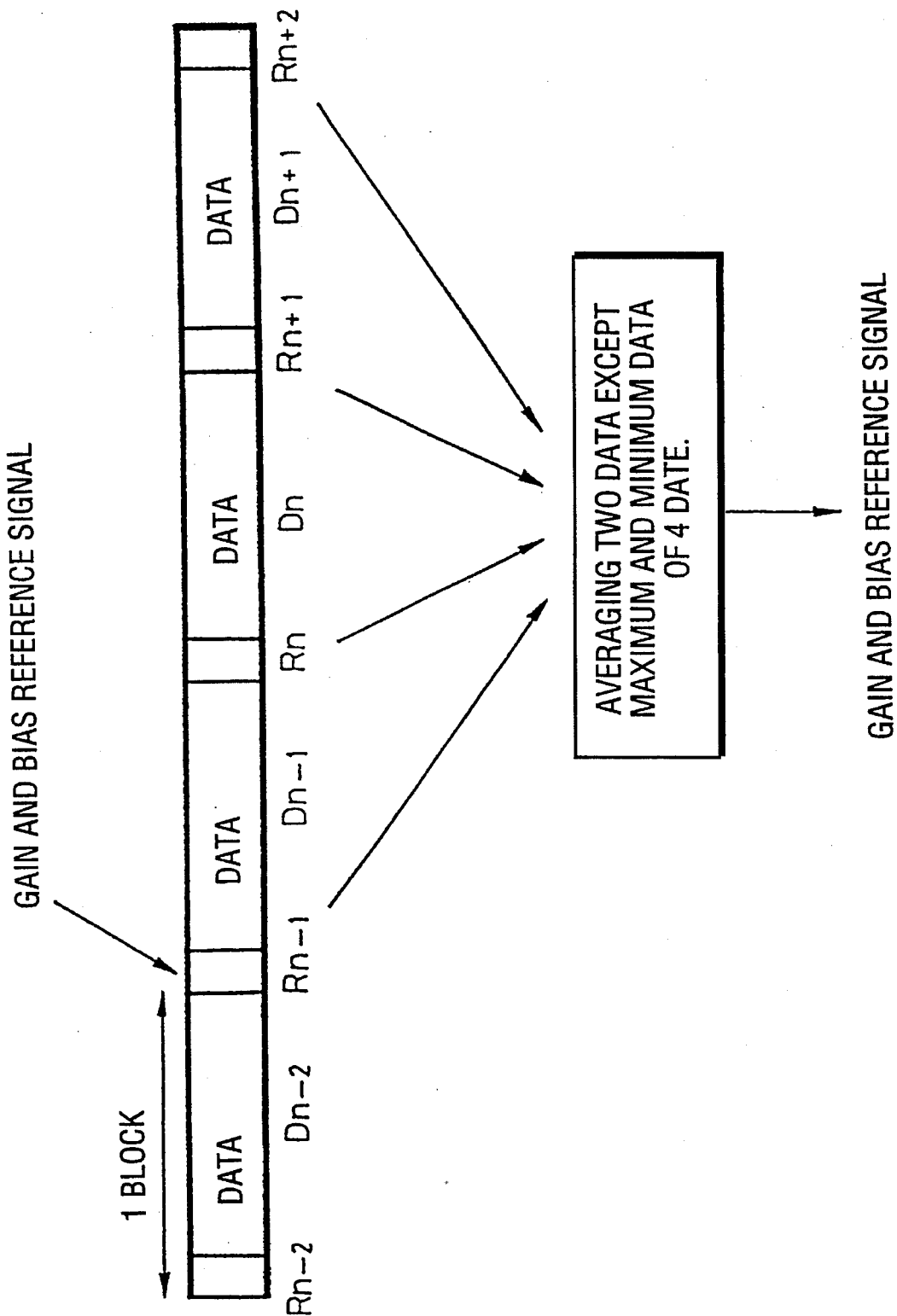
FIG. 27 is a diagram used to explain operation of a defect eliminating circuit 73 of FIG. 26.

More specifically, the defect eliminating circuit 73 can store therein 4 blocks of, for example, data input from the A/D converter circuit 9 as shown in FIG. 27. Then, position reference data (0, 0) in respective blocks are compared and average value of two data except the maximum and minimum values is calculated, which then is used as data of the position reference data (0, 0). Therefore, even if the value of position reference data (0, 0) becomes an abnormal value due to the dropout or the like, such abnormal value can be prevented from being used as the reference data.

This is also true in other defect eliminating circuits 74, 82, 84.

Incidentally, because the defect eliminating circuits 73, 74, 82, 84 must store data of 4 blocks, the FIFIOs 71, 72, 81, 83 must are used to delay data by the delay amounts based on such data and supply the same to the subtracting circuits 42, 44 or the gain variable amplifiers 63, 66.

Figure 28:
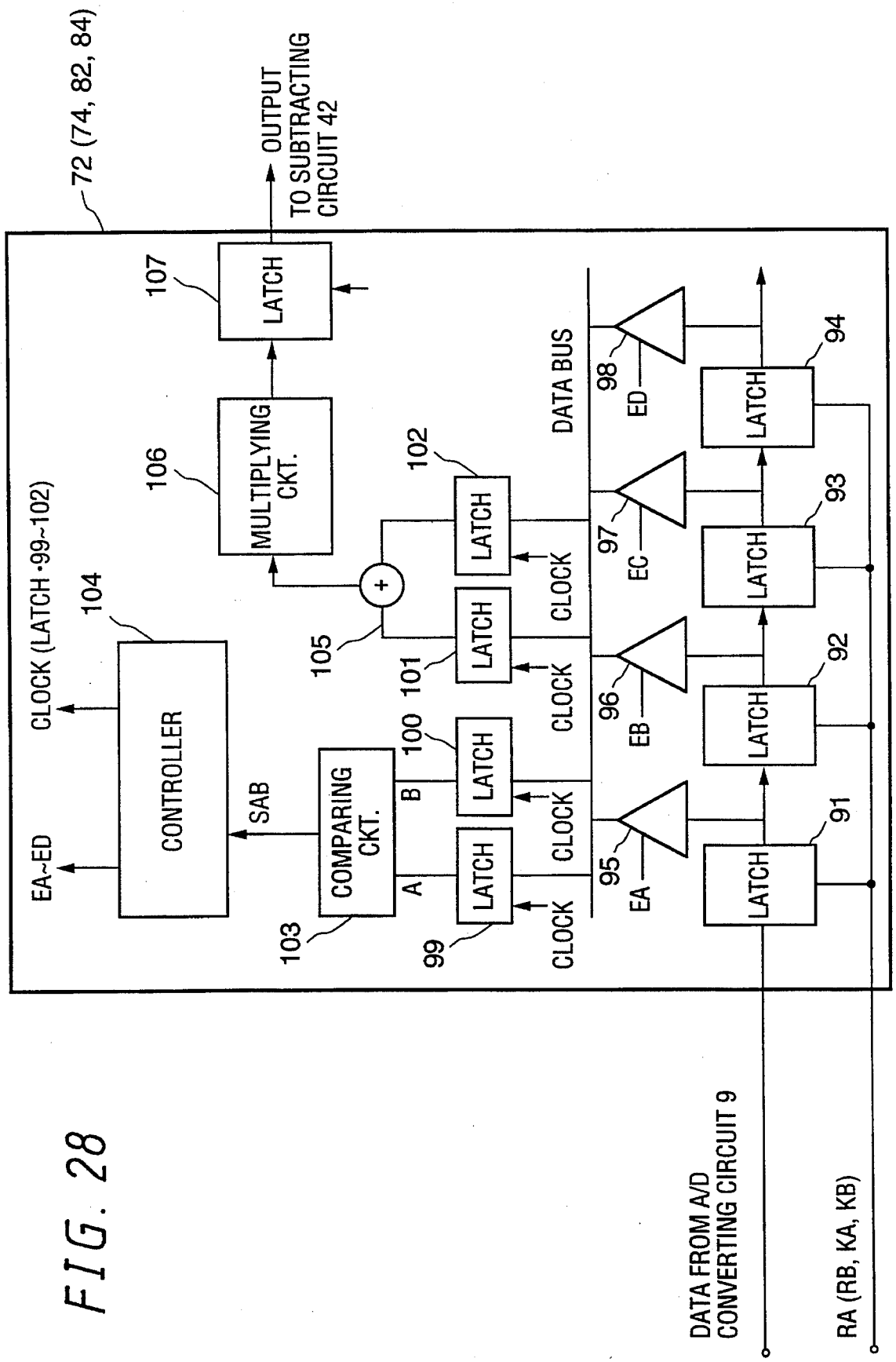
FIG. 28 is a block diagram showing an example of an arrangement of the defect eliminating circuit 73 of FIG. 26.

FIG. 28a shows an example of an arrangement of the defect eliminating circuit 73 (84, 82, 84). In this embodiment, data input from the A/D converter circuit 9 is sequentially latched in the latch circuits 91 through 94 in synchronism with the clock RA. Then, the data latched in the latch circuits 91 to 94 are read out to the data bus when gates 95 to 98 are turned on. Data on the data bus are latched in latch circuits 99 through 102 at a predetermined timing in synchronism with a clock output from a controller 104. This controller 104 is comprised of a CPU for processing a variety of calculations, a ROM in which a program used by this CPU is stored in advance, etc.

Data latched in the latch circuits 99 and 100 are supplied to a comparing circuit 103, in which they are compared in level. Then, a signal SAB corresponding to the compared result is supplied to the controller 104. The controller 104 supplies gate control signals EA, EB, EC, ED to the gates 85 to 98 from which predetermined data are output to the data bus, and also generates clocks output to the latch circuits 99 to 102. Also, the controller judges a maximum value and a minimum value of data latched in the latch circuits 91 to 94 from the signal supplied from the comparing circuit 103 on the basis of a table shown in FIG. 29.

More specifically, the controller 104 outputs a predetermined one of the gate control signals EA through ED at a predetermined timing and allows the latch circuits 99 and 100 to latch therein predetermined two data of the data latched in the latch circuits 91 to 94. The magnitude of the thus latched data is judged by the comparing circuit 103. By repeating this processing several times, the maximum value and the minimum value of the data latched in the latch circuits 91 to 94 are calculated.

In FIG. 29, of latch data $R_{n-1}$ to $R_{n+2}$, when the left-hand side data on the uppermost row is larger than the right-hand side data, such data is expressed by a logic 1. When it is smaller, such data is expressed by a logic 0. When it is not definite, such data is expressed by X. For example, when data $R_{n-1}$ latched in the latch circuit 94 is larger than data $R_n$ latched in the latch circuit 93, when data $R_{n-1}$ latched in the latch circuit 94 is larger than data $R_{n+1}$ latched in the latch circuit 92 and when data $R_{n-1}$ latched in the latch circuit 94 is larger than data $R_{n+2}$ latched in the latch circuit 91, then the data $R_{n-1}$ latched in the latch circuit 94 becomes a maximum value.

Further, when data $R_{n-1}$ is larger than data $R_n$, when data $R_n$ is larger than data $R_{n+1}$ and when data $R_n$ is larger than data $R_{n+2}$, data $R_n$ becomes a maximum value.

Similarly, the maximum values and the minimum values will be obtained from FIG. 27 hereinafter.

On the basis of the table shown in FIG. 29, the controller 104 reads out other data than the maximum and minimum values to the data bus from the data $R_{n-1}$ to $R_{n+2}$ stored in the latch circuits 91 to 94 when the maximum and minimum values are detected and latch the same in the latch circuits 101 and 102. The data latched in the latch circuits 101 and 102 are added by an adding circuit 105, multiplied with a coefficient ½ by a multiplying circuit 106 and then supplied to a latch circuit 107, in which it is latched. More specifically, average value of two data except the maximum value and the minimum value of the data $R_{n-1}$ to $R_{n+2}$ latched in the latch circuits 91 to 94 is lathed in the latch circuit 107. This data is supplied to the subtracting circuit 42.

Figure 26:
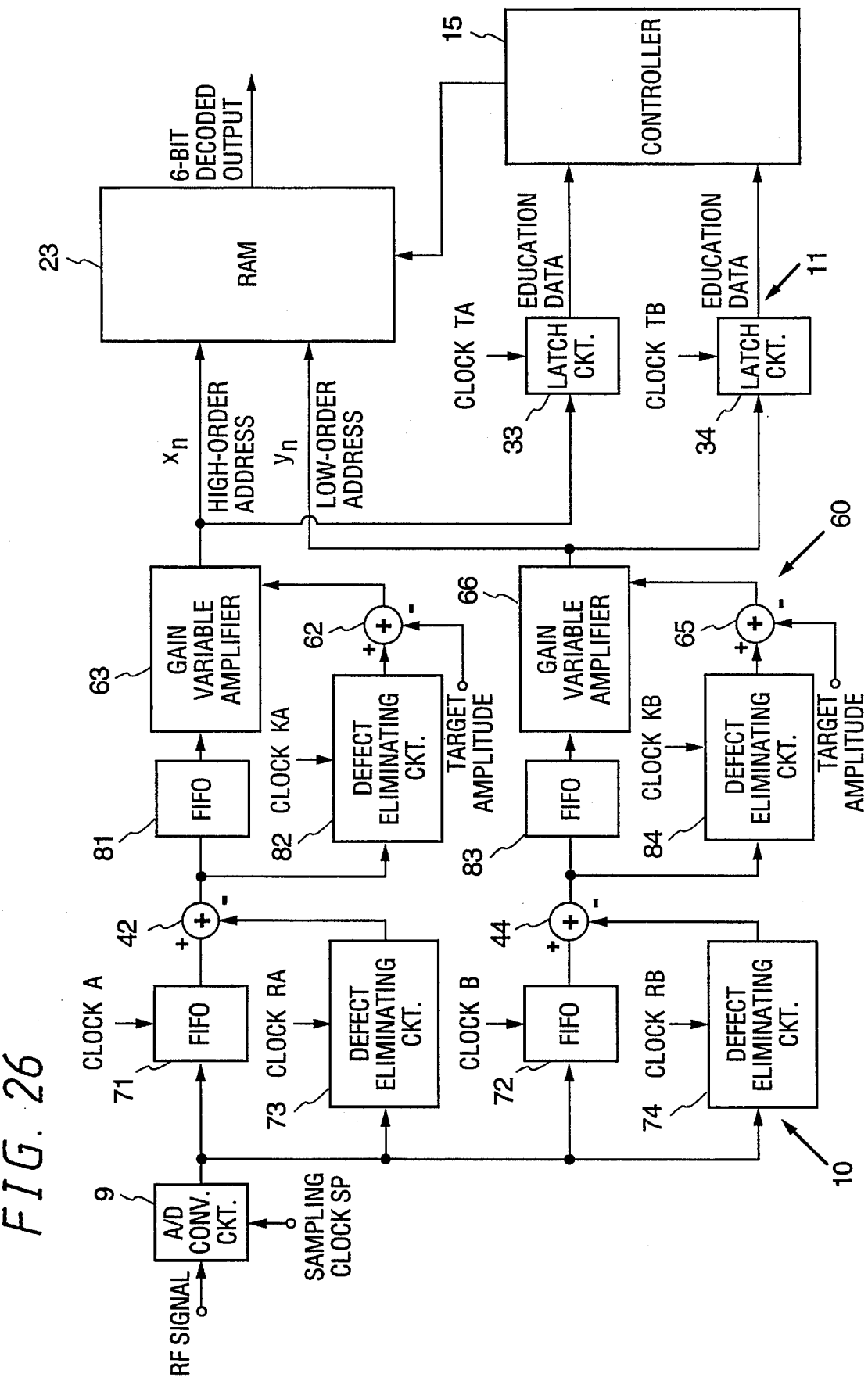
FIG. 26 is a block diagram showing an arrangement of a further embodiment of the optical disk reproducing apparatus to which the information reproducing apparatus of the present invention is applied.
Figure 30:
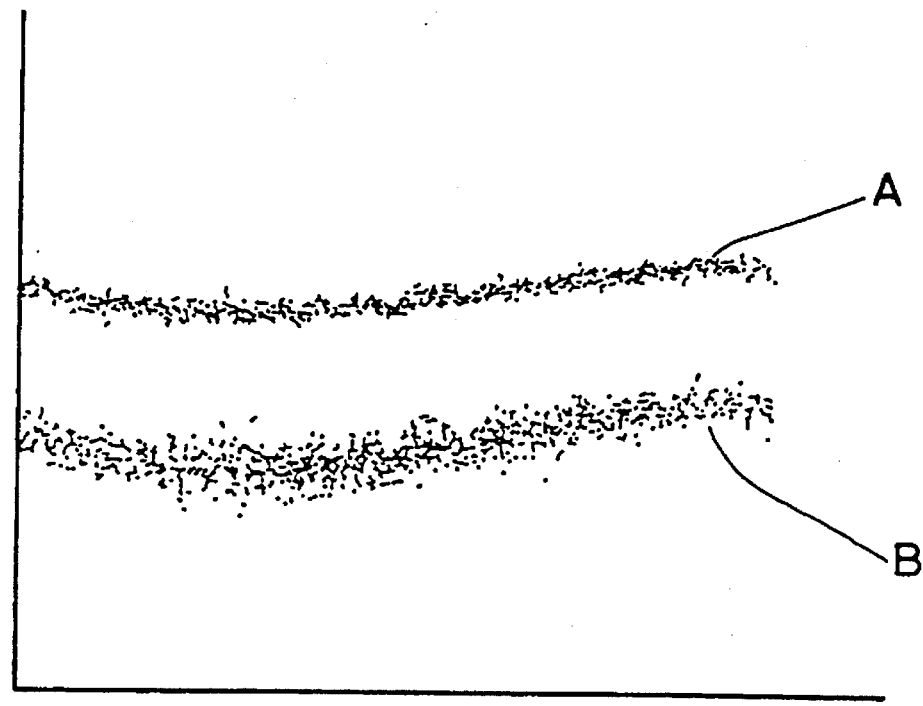
FIG. 30 is a diagram used to explain the influence exerted by the defect of the outputs of the gain variable amplifiers 63, 66 of FIG. 26.

FIG. 30 shows the change of level obtained when the defect eliminating circuits 73, 74, 82, 84 are used (shown by A in the figure) in FIG. 26 and when they are not used (shown by B in the figure). It is to be appreciated that, when the defect eliminating circuits are not used, the level is fluctuated in response to the defect caused by the dropout or the like. On the other hand, it is to be understood that when the defect eliminating circuits are used, the defect is eliminated so that the fluctuation of the level is suppressed. That is to say, data can be judged more accurately.

Figure 31:
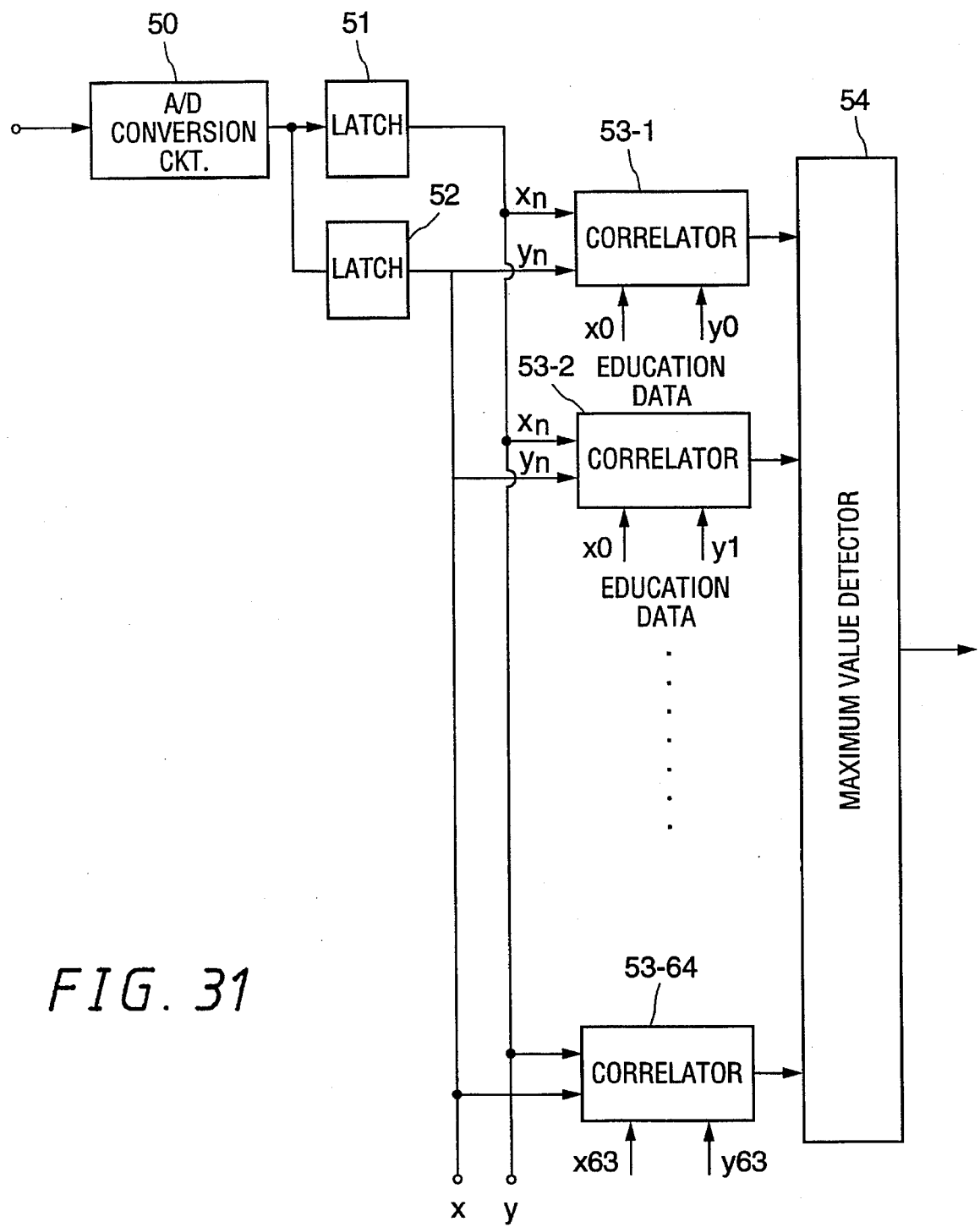
FIG. 31 is a block diagram showing an example of other arrangement for calculating a minimum distance between education data and reproduced data.

Furthermore, the minimum distance between the information point obtained from the reproduced data and the reference point set by the education data can be also detected by a circuit arrangement shown, for example, in FIG. 31.

In this embodiment, the reproduced RF signal is A/D-converted by an A/D converter circuit 50 and then latched by latch circuits 51, 52. The latch circuit 51 latches data corresponding to the front edge of, for example, the above-mentioned pit and the latch circuit 52 latches data corresponding to the rear edge thereof. Data latched by the latch circuits 51 and 52 are supplied to 64 correlators 53-1 through 53-64. 64 education data are supplied to the correlators 53-1 to 53-64, respectively. Each of the correlators 53-1 to 53-64 calculates a correlation between data supplied from the latch circuits 51, 52 and education data and outputs a calculated result to a maximum value detector 54. The maximum value detector 54 is formed of, for example, a Winner Take All circuit and detects and outputs maximum data from 64 data supplied thereto from the correlators 53-1 to 53-64.

While the CLV mode is described above, the present invention is not limited thereto and the CAV mode also may be applied to the present invention. In this case, if pits are disposed so as to have a phase displacement of 90 degrees between adjacent tracks, then an influence of a crosstalk between the adjacent tracks can be reduced and the high density on the track direction can be realized.

While all reference points corresponding to the education data are mapped onto the RAM 23 as described above, the present invention is not limited thereto and such a variant is also possible that only reference points of a part thereof (e.g., 16 portions) may be mapped by education data and other references points may be interpolated by the calculation from the reference points mapped by the education data.

Finally, an embodiment of a recording apparatus for the above high recording density optical disk 1 will be described.

Figure 32:
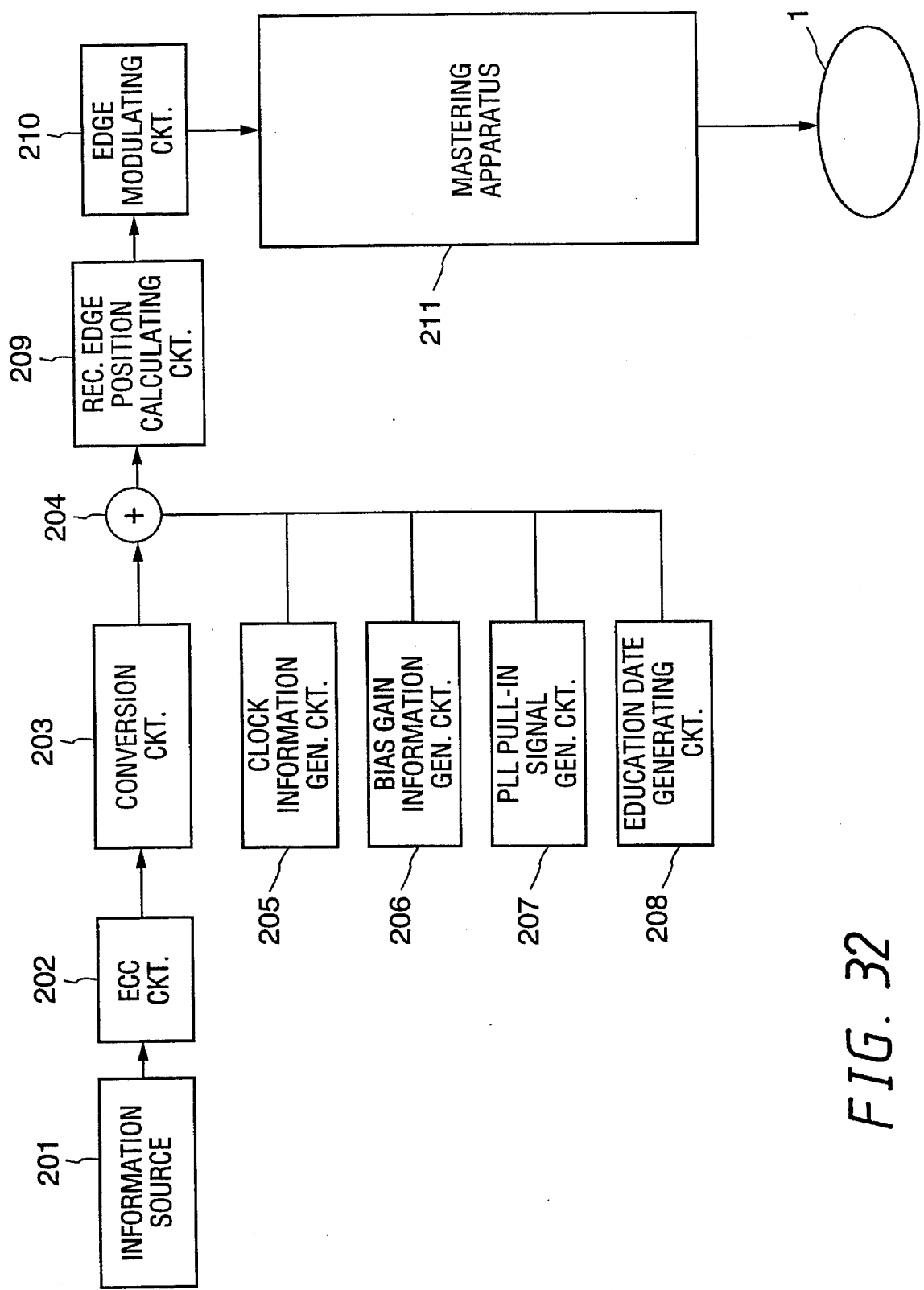
FIG. 32 is a block diagram showing an arrangement of an embodiment of an optical disc manufacturing apparatus to which an information recording apparatus of the present invention is applied.

In FIG. 32, an information source 201 outputs an audio signal in the form of a digital signal as a signal to be recorded. A ECC circuit 202 adds an error correction code to digital audio data supplied from the information source 201 and outputs the same to a conversion circuit 203. The conversion circuit 203 converts input data into data of 3-bit unit. More specifically, in this embodiment, edge position of each pit is set to any one positions of from 0 to 7. The 3-bit data is required in order to specify each edge position. The conversion circuit 203 generates this 3-bit data.

A clock information generating circuit 205 generates data necessary for generating a clock that is required to read out data recorded in the optical disk 1. A bias gain information generating circuit 206 generates data indicative of a bias point (data indicative of the reference point (0, 0) and data indicative of the fact that positions of the front end edge and the rear end edge are both 0) and data for setting a gain (data indicative of the reference point (7, 7) and data indicative of the positions of the front end edge and the rear end edge are both 7).

A PLL pull-in signal generating circuit 207 generates a signal that is used to pull-in the PLL. An education data generating circuit 208 generates data whose edge position (an, bn) corresponds to edge positions of (0, 0) to (7, 7). Data output from the clock information generating circuit 205, the bias gain information generating circuit 206, the PLL pull-in signal generating circuit 207 and the education data generating circuit 208 are all supplied to an adder 204, in which they are added with data supplied from the conversion circuit 203 (in a time division multiplexed).

An output of the adder 204 is supplied to a recording edge position calculating circuit 209, and an output of this recording edge position calculating circuit 209 is output to an edge modulating circuit 210. An output of the edge modulating apparatus 210 is supplied to a mastering circuit 211 and the optical disk(1) is formed through the processes such as cutting, development, plating process, transfer process, aluminum evaporation, protecting film coating process or the like.

In the above-mentioned arrangement, the edge modulating circuit 210 generates a timing signal of a timing corresponding to data output from the recording position calculating circuit 209 and outputs the same to the mastering circuit 211.

The edge position modulating circuit 210 is arranged to generate timing signals of timings such that the front end and rear end edge positions of each pit are shifted from the reference position of the center of these pits in 8 stages in response to digital information to be recorded. In this case, the shift period Ts of the edge position of each pit is set so as to fall within a range corresponding to a period smaller than a transition period (leading period tr or trailing period tf) of the RF signal determined in response to a transfer characteristic of the optical detection system (pickup 3) on the reproducing apparatus side.

The mastering apparatus 211 cuts the photosensitive film coated on a recording master disk in response to a timing signal supplied thereto from the edge modulating circuit 210 by a laser beam. The master disk thus cut is developed, and plated to thereby form stampers. Then, pits formed on the stampers are transferred onto a replica. This replica is treated by an aluminum evaporation process and is coated with a protecting film, thereby the optical disk 1 being manufactured.

As described above, according to the information recording medium of the present invention, since the edge position of information pit is shifted in a step-wise fashion from the predetermined reference position in response to the digital information to be recorded within a range corresponding to the predetermined shift period smaller than the transition period of the reproducing signal determined in response to the transfer characteristic of the optical detection system, a recording density of twice or more can be obtained as compared with the conventional CD system.

According to the information reproducing apparatus for reproducing the information recording medium of the present invention, since the reproducing level can be detected at one sampling timing in the transition period of a reproducing signal, recording information corresponding to the shift amount of the edge position of information pit can be judged reliably so that information of high recording density can be reproduced accurately by a simplified arrangement. Therefore, the arrangement thereof can be simplified and the apparatus can be made inexpensive.

Further, since recording information corresponding to each of the shift amounts of the edge positions adjacent in the pit rows of information pits is judged on the basis of the reference points defined by the reproducing level sequentially detected from the education pit in which education data pre-determined in response to the insertion positions relative to the pit rows of the information pit are set as respective shift amounts of the edge positions adjacent in the pit row direction and the information points defined by the reproducing level sequentially detected from the information pit, a non-molding intersymbol interference can be reduced without emphasizing the noise component. Furthermore, the recording density can be increased more and the more accurate decoding becomes possible.

Further, since the reference points are mapped in a storage means fashion, the edge position can be judged easily and rapidly.

Further, since the reference points are mapped from the education pits recorded on the information recording medium, data can be accurately read out without being affected by the fluctuation of the information recording medium.

Further, since a part of the reference points are obtained from the references points defined from the education pit by the calculation, the number of education pits recorded on the information recording medium can be reduced and the capacity of the information recording medium can be utilized more effectively.

Further, since the reference point is stored in the storage point defined by the address corresponding to the reproducing level of the education pit, the reference point corresponding to the information point can be judged with ease.

Further, since the reference point stored in the nearest storage points of the reference points defined by the address corresponding to the reproducing level of the education pit is stored in the storage point other than storage points defined by the address corresponding to the reproducing level of the education pit, the corresponding reference point can be judged rapidly and the accurate decoding becomes possible even when the reproducing level is fluctuated somewhat by the noise.

Further, since the signal corresponding to the reference pit located at the shift position in which the edge shift amount is smallest is subtracted from the signal reproduced from the information recording medium, data can be read out accurately without being affected by the influence of the local characteristic fluctuation of the information recording medium itself.

Further, since the signals correspond to the reference pits located at the shift position at which the edge shift amount is smallest and at the shift position at which the edge shift amount is largest are subtracted from the signal reproduced from the information recording medium, data can be read out accurately regardless of the respective fluctuations of the information recording medium and the local characteristics of the inside thereof.

Furthermore, since the education pits are formed, the recorded data can be reproduced accurately without being affected by the fluctuations of the information recording medium and the characteristics of the reproducing apparatus.

Furthermore, since the education data is formed apart from the data pit, it is possible to suppress education data from being affected by the recorded data.

Furthermore, since the reference pit having the edge of the shift position at which the shift amount is smallest is recorded at the predetermined position other than the data pit, it is possible to realize the information recording medium which can read out data accurately even when there occur fluctuations.

Furthermore, since the reference pit having the edge position of the shift position at which the shift amount is largest is recorded at the predetermined position other than the data pit, it is possible to realize the information recording medium from which data can read out accurately even when there occurs local characteristic fluctuation.

Furthermore, since the reference pits having the edge of the shift position at which the shift amount is smallest and the edge of the shift position at which the shift amount is largest are recorded at the predetermined positions other than the data pit, it is possible to realize the information recording medium from which data can be read out accurately regardless of the respective fluctuations and the local fluctuations.

In addition, according to the information recording apparatus of the present invention, the dynamic range of the length of the pit to be recorded is low so that the influence of the heat accumulation effect upon recording can be ignored substantially. Therefore, a satisfactory signal characteristic can be obtained when data is recorded with the high recording density.

We claim:

1. An information recording medium of the type formed by the process of recording digital information as pits on the information recording medium which can be reproduced by an optical detection system which obtains a reproduced signal corresponding to each pit by scanning said information recording medium along pit rows, wherein the improvement comprises forming said information recording medium by the process of:

shifting an edge position of each information pit in a step-wise fashion from a predetermined reference position in response to digital information to be recorded, wherein said digital information is recorded as shift amounts of multiple stages of said edge positions; and inserting an education pit into a pit row and step-wise shifting a pair of edge positions adjacent to a pit row direction of said education pit from said predetermined reference position in response to a pair of education data pre-determined corresponding to an insertion position.

2. The information recording medium according to claim 1, wherein said education pit is located at the position adjacent to said information pit, and wherein said education pit has its edge opposite to an edge opposing to said information pit shifted in a step-wise fashion in response to said education data.

3. An information recording medium of the type formed by the process of recording digital information as pits on the information recording medium which can be reproduced by an optical detection system which obtains a reproduced signal corresponding to each pit by scanning said information recording medium along pit rows, wherein the improvement comprises:

forming said information recording medium by the process of shifting an edge position of each information pit in a step-wise fashion from a predetermined reference position in response to digital information to be recorded, wherein said digital information is recorded as shift amounts of multiple stages of said edge positions; and inserting a pair of reference pits into pit rows wherein at least one edge of said pair of reference pits having an edge position shift amount set to a minimum value and at least one other edge of said pair of reference pits having an edge position shift amount set to a maximum value.

4. The information recording medium according to claim 3, wherein, of edge positions of said pair of reference pits, shift amounts of a pair of edge positions adjacent to the pit row directions are both set to minimum values and shift amounts of another pair of edge positions adjacent to the pit row directions are both set to maximum values.

5. The information recording medium according to claim 3, further comprising an education pit, inserted into a pit row, whose edge position is shifted in a step-wise fashion from said predetermined reference position in response to education data and which is pre-determined corresponding to an insertion position.

6. The information recording medium according to claim 5, wherein a pair of edge positions adjacent to a pit row direction of said education pit are shifted in a step-wise fashion from said predetermined reference position in response to a pair of education data pre-determined corresponding to said insertion position.

7. The information recording medium according to claim 6, wherein all possible combinations are pre-determined in response to said insertion position as said pair of education data and education pits corresponding to education data of said all combinations are sequentially inserted into and disposed at the insertion position of the pit row.

8. An information recording apparatus of the type which includes recording means for recording digital information on an information recording medium from which recorded information is reproduced by an optical detection system which scans said information recording medium along pit rows by a light beam, wherein the improvement comprises that the recording means records each information pit so that edge positions of each information pit are shifted in a step-wise fashion from a predetermined reference position, wherein said digital information is recorded as shift amounts of multiple stages of said edge positions, and wherein said recording means records on said information recording medium a pair of reference pits inserted into pit rows and wherein at least one edge of said pair of reference pits having an edge position shift amount set to a minimum value and at least one other edge of said pair of reference pits having an edge position shift amount set to a maximum value.

9. The information recording apparatus according to claim 8, wherein said recording means records on said information recording medium an education pit, inserted into a pit row, whose edge positions are shifted in a step-wise fashion from said predetermined reference position in response to education data and which is predetermined in response to an insertion position.

10. The information recording apparatus according to claim 8 or 9, wherein said recording means records on said information recording medium a reference pit inserted into a pit row and whose edge position shift amount is set to a minimum value.

11. The information recording apparatus according to claim 8 or 9, wherein said recording means records on said information recording medium a reference pit inserted into a pit row and whose edge position shift amount is set to a maximum value.

12. An information reproducing apparatus for reproducing recorded information from an information recording medium in which digital information is recorded by shifting in a step-wise fashion edge positions of an information pit from a predetermined reference position within a range corresponding to a predetermined shift period smaller than a transition period of a reproduced signal determined in response to a predetermined transfer characteristic, comprising:

an optical detection system, having the predetermined transfer characteristic used in determining the step-wise shift of the edge positions of the information pits during recording, for scanning said information recording medium along information pit rows with a light beam, detecting, by means of light reflected from the information recording medium, edge transitions of the information pits, and generating a corresponding reproduced signal;

clock generating means for generating a clock synchronized in phase with said reference position on the basis of the reproduced signal obtained from said optical detection system;

level detection means for detecting a reproducing level in said transition period of said reproduced signal at a timing defined by said clock;

judging means for judging recorded information corresponding to the edge positions of said information pit on the basis of said reproducing level; and gain adjusting means for adjusting a gain of the reproducing level detected by said level detection means such that the reproducing level detected from a reference pit in which the edge position shift amount is set to a maximum value becomes a predetermined target value.

13. The information reproducing apparatus according to claim 12, further comprising bias eliminating means for subtracting a reproducing level detected from the reference pit in which a shift amount of an edge position is set to a minimum value from the reproduced level detected by said level detection means.

14. The information reproducing apparatus according to claim 12, wherein said gain adjusting means has a defect eliminating function for adjusting a gain of the reproducing level detected by said level detection means such that an average value of respective values except a maximum value and a minimum value of a plurality of reproducing levels detected from a plurality of reference pits in which the edge position shift amount is set to the maximum value becomes a predetermined target value.

15. An information reproducing apparatus for reproducing recorded information from an information recording medium in which digital information is recorded by shifting in a step-wise fashion edge positions of an information pit from a predetermined reference position within a range corresponding to a predetermined shift period smaller than a transition period of a reproduced signal determined in response to a predetermined transfer characteristic, comprising:

an optical detection system, having the predetermined transfer characteristic used in determining the step-wise shift of the edge positions of the information pits during recording, for scanning said information recording medium along information pit rows with a light beam, detecting, by means of light reflected from the information recording medium, edge transitions of the information pits, and generating a corresponding reproduced signal;

clock generating means for generating a clock synchronized in phase with said reference position on the basis of the reproduced signal obtained from said optical detection system;

level detection means for detecting a reproducing level in said transition period of said reproduced signal at a timing defined by said clock;

judging means for judging recorded information corresponding to the edge positions of said information pit on the basis of said reproducing level; and bias eliminating means for subtracting the reproducing level detected from a reference pit in which the edge position shift amount is set to a minimum value from the reproducing level detected by said level detection means and a gain adjusting means for adjusting the gain of the reproduced level output from said bias eliminating means such that the reproducing level detected from said reference pit in which the edge position shift amount is set to a maximum value becomes a predetermined target value.

16. The information reproducing apparatus according to claim 12 or 15, wherein said clock generating means generates a clock at a timing corresponding to the center of said shift period.

17. The information reproducing apparatus according to claim 12 or 15, wherein said clock generating means generates a clock synchronized in phase with said reference position from a reference pit indicative of a predetermined reference position recorded on a servo area of said information recording medium on the basis of the reproduced signal obtained through said optical detection system.

18. The information reproducing apparatus according to claim 12 or 15, wherein said level detection means is formed of an A/D converter circuit for detecting said reproducing level by analog/digital-converting said reproduced signal sampled at the sampling timing defined by said clock.

19. The information reproducing apparatus according to claim 18, wherein said A/D converter circuit converts said reproduced signal into digital data whose bit number is larger than that indicated by a shift amount of edge position of said information pit.

20. The information reproducing apparatus according to claim 12 or 15, wherein said judging means judges recorded information corresponding to respective shift amounts of edge positions adjacent to a pit row direction from an education pit in which education data predetermined in response to an insertion position relative to a pit row are set as shift amounts of edge positions adjacent to the pit row direction on the basis of the reference points defined by reproducing levels sequentially detected from said information pit and information pits defined by the reproducing levels sequentially detected from said information pit.

21. The information reproducing apparatus according to claim 12 or 15, wherein said judging means learns reference points defined by a pair of reproducing levels detected by said level detection means from an education pit in which a pair of education data pre-determined in response to an insertion position are set as respective shift amounts of a pair of edge positions and judges recorded information corresponding to respective shift amounts of a pair of edge positions adjacent to the pit row direction on the basis of said reference points and information pits defined by a pair of reproducing levels detected from said information pit.

22. The information reproducing apparatus according to claim 12 or 15, further comprising memory means for storing a pair of education data on a reference point as decoded data, said reference point being an address that is defined when one reproducing level of a pair of reproducing levels detected from an education pit in which said pair of education data are set is taken as a high-order address and the other reproducing level is taken as a low-order address and said judging means judges as recorded information a pair of decoded data stored in said memory means at its address corresponding to an information point, said information point being formed of an address when one reproducing level of a pair of reproducing levels detected from said information pit is taken as a high-order address and the other reproducing level is taken as a low-order address.

23. The information reproducing apparatus according to claim 22, wherein said judging means judges as recorded information decoded data stored in a reference point nearest to said information point from decoded data stored in respective reference points of said memory means.

24. The information reproducing apparatus according to claim 23, further comprising mapping means for using an address of said memory means defined by the reproducing level detected from the education pit in which said pair of education data is set and effecting a mapping processing so that said pair of education data are stored in said reference point as decoded data.

25. The information reproducing apparatus according to claim 24, wherein said mapping means stores decoded data stored in the reference point nearest to said respective storage points in respective storage points other than said reference points of respective storage points of said memory means.

26. The information reproducing apparatus according to claim 24, wherein said memory means is formed of a semiconductor memory in and from which data can be written/read at any time.

\* \* \* \* \*